US012113260B2

(12) United States Patent
Gimersky

(10) Patent No.: US 12,113,260 B2
(45) Date of Patent: Oct. 8, 2024

(54) DUAL-BAND SEPTUM POLARIZER

(71) Applicant: VIASAT, INC., Carlsbad, CA (US)

(72) Inventor: Martin Gimersky, Morges (CH)

(73) Assignee: Viasat, Inc., Carlsbad, CA (US)

( * ) Notice: Subject to any disclaimer, the term of this patent is extended or adjusted under 35 U.S.C. 154(b) by 360 days.

(21) Appl. No.: 17/620,038

(22) PCT Filed: Jun. 18, 2020

(86) PCT No.: PCT/US2020/038513
§ 371 (c)(1),
(2) Date: Dec. 16, 2021

(87) PCT Pub. No.: WO2020/257511
PCT Pub. Date: Dec. 24, 2020

(65) Prior Publication Data

US 2022/0263209 A1 Aug. 18, 2022

Related U.S. Application Data

(60) Provisional application No. 62/863,639, filed on Jun. 19, 2019.

(51) Int. Cl.
*H01P 1/165* (2006.01)
*H01P 1/16* (2006.01)
(Continued)

(52) U.S. Cl.
CPC ................ *H01P 1/173* (2013.01); *H01P 1/16* (2013.01); *H01P 1/165* (2013.01); *H01P 3/12* (2013.01);
(Continued)

(58) Field of Classification Search
CPC .... H01P 3/00; H01P 5/00; H01P 5/082; H01P 1/165; H01P 1/173; H01P 3/12
(Continued)

(56) References Cited

U.S. PATENT DOCUMENTS 4,122,406 A 10/1978 Salzberg
4,725,795 A 2/1988 Ajioka et al.
(Continued)

FOREIGN PATENT DOCUMENTS

EP 3618172 A1 3/2020
GB 1365484 11/1970
(Continued)

OTHER PUBLICATIONS

Piovano et al., entitled "CAD and Optimization of Compact Wide-band Septum Polarizers", CSELT—Centro Studi e Laboratori Telecomunicazioni V. Reiss Romoli, 274-10148 Torino, Italy, Dipartimento di Electtronica, Universita di Perugia, I-06100 Perugia, Italy; 29th European Microwave Conference—Munich 1999, 4 pages.

*Primary Examiner* — Rakesh B Patel
(74) *Attorney, Agent, or Firm* — Holland & Hart LLP

(57) ABSTRACT

Methods, systems, and devices are described for improving a performance of a waveguide device. A waveguide device that includes a common port and divided ports may also include a sidewall feature that extends across a first set of opposing sidewalls and a second set of opposing sidewalls of the waveguide device. The sidewall feature may have a same shape on each of the first set of opposing sidewalls and a second set of opposing sidewalls. In some cases, the sidewall feature is positioned outside a divided waveguide section of the waveguide device. The position of the sidewall feature may be determined based on an impedance matching metric between the common port and the divided ports, an isolation metric between the divided ports, or both.

31 Claims, 6 Drawing Sheets

(51) Int. Cl.

| | |
|---|---|
| ***H01P 1/17*** | (2006.01) |
| ***H01P 3/00*** | (2006.01) |
| ***H01P 3/12*** | (2006.01) |
| ***H01Q 13/02*** | (2006.01) |
| ***H01Q 15/24*** | (2006.01) |

(52) U.S. Cl.
CPC ......... *H01Q 13/025* (2013.01); *H01Q 15/242* (2013.01)

(58) Field of Classification Search
USPC ................ 333/208, 209, 236, 239, 245, 248
See application file for complete search history.

(56) References Cited

U.S. PATENT DOCUMENTS

| | | | |
|---|---|---|---|
| 5,305,001 | A | 4/1994 | Wong et al. |
| 6,563,470 | B2 | 5/2003 | Em et al. |
| 9,263,781 | B2 | 2/2016 | Bruce et al. |
| 9,653,814 | B2 | 5/2017 | Baekelandt et al. |
| 10,164,313 | B2 | 12/2018 | Schneider et al. |
| 10,243,245 | B2 | 3/2019 | Jensen et al. |
| 10,320,042 | B2 | 6/2019 | Jensen |
| 2009/0250640 | A1 | 10/2009 | Boutigny et al. |
| 2017/0141478 | A1 | 5/2017 | Jensen |

FOREIGN PATENT DOCUMENTS

| | | |
|---|---|---|
| IL | 246927 | 12/2016 |
| JP | 2002094301 | 3/2002 |
| JP | 6031999 | 12/2012 |
| JP | 2014 127784 A | 7/2014 |

DUAL-BAND SEPTUM POLARIZER

CROSS REFERENCE

The present application for patent is a 371 national phase filing of International Patent Application No. PCT/US2020/038513 by GIMERSKY, entitled “DUAL-BAND SEPTUM POLARIZER,” filed Jun. 18, 2020; and claims priority to U.S. Patent Application No. 63/863,639 by GIMERSKY, entitled “DUAL-BAND SEPTUM POLARIZER,” filed Jun. 19, 2019, each of which is assigned to the assignee hereof, and each of which is expressly incorporated by reference in its entirety herein.

BACKGROUND

The present disclosure relates to wireless communications systems, and more particularly to waveguide devices that may be employed in such systems.

By way of example, a waveguide device may be used for uni-directional (transmit or receive) or bi-directional (transmit and receive) processing of polarized waves. The waveguide device may include a polarizer that converts between polarized (e.g., linearly polarized, circularly polarized, etc.) waves used for transmission and/or reception via a common waveguide and signals associated with basis polarizations of the polarizer in a divided waveguide section. The polarizer may be a passive polarization transducer. A septum polarizer is one such passive polarization transducer that can operate in a bi-directional manner. A septum polarizer includes a septum which forms a boundary between first and second divided waveguides associated with the basis polarizations. Septum polarizers may provide favorable isolation between the divided waveguides and may be used for concurrent transmission and reception of polarized signals.

Septum polarizer performance has become challenged by increases in bandwidth requirements for various applications. For example, in some applications a septum polarizer may be used to convert the polarization of signals at more than one carrier signal frequency, in which case the operational bandwidth of the septum polarizer may be relatively large. A septum polarizer that polarizes signals associated with multiple carrier frequencies may be referred to as a dual-band septum polarizer. Supporting a wider operational bandwidth may cause higher order modes in a septum polarizer to be excited, degrading signal propagation characteristics within the waveguide device.

SUMMARY

Methods, systems and devices are described for enhancing performance of a dual-band waveguide device using sidewall features. As disclosed herein, a housing of a dual-band waveguide device may be modified to enhance the radio frequency (RF) response of the dual-band waveguide device while maintaining characteristics sought by a selected cross-sectional area and other characteristics for the dual-band waveguide device. That is, the cross-sectional area and septum configuration for a dual-band waveguide device may be selected to enhance certain RF characteristics (e.g., polarization purity) while modifications to the housing may be used to enhance other RF characteristics (e.g., impedance matching and port-to-port isolation) that mitigate the effects of processing signals having a wide frequency range.

In some examples, the housing of the dual-band waveguide device may be configured to include a sidewall feature that extends around the interior of the dual-band waveguide device as an inset or outset step. The sidewall feature may be included in a common waveguide section or a polarizer section of the dual-band waveguide device. The sidewall feature may be symmetric—e.g., each portion of the sidewall feature may have a uniform width and be centered around a same point on a central axis of the dual-band waveguide device.

In some examples, the housing of the dual-band waveguide device may be further configured to include a second sidewall feature that extends around the interior of the dual-band waveguide device as an inset or outset step. The second sidewall feature may be included in a divided waveguide section or a polarizer section of the dual-band waveguide device. The second sidewall feature may similarly be symmetric and extend around the interior of the dual-band waveguide device as an inset or outset step. Alternatively, the second sidewall feature may be disposed solely on the sidewalls of the dual-band waveguide device that run parallel with surfaces of the septum.

DETAILED DESCRIPTION

Figure 1A:
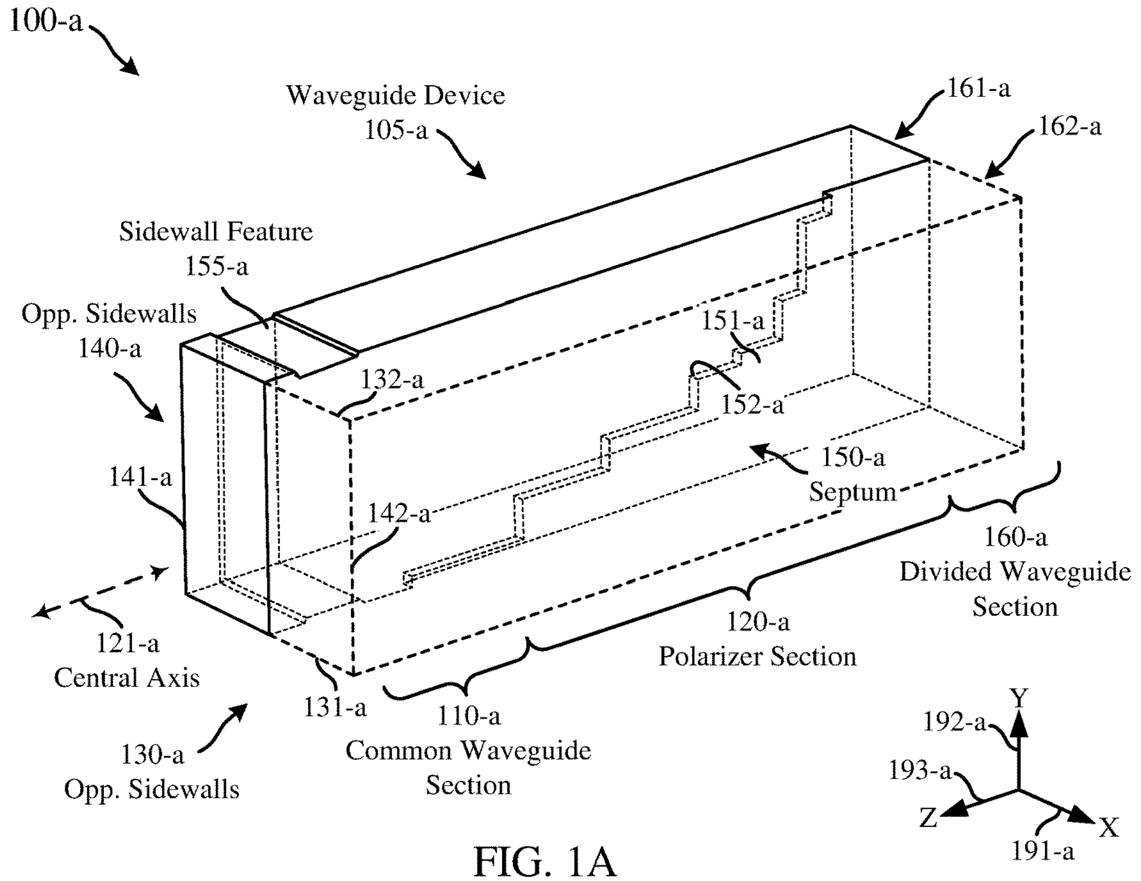
FIGS. 1A and 1B show three-dimensional views of an example dual-band waveguide device with sidewall features in accordance with various aspects of the present disclosure.

A radio frequency (RF) response of a waveguide device may be enhanced by improving a polarization purity of signals propagating through the waveguide device; impedance matching between a common port and divided waveguide ports of the waveguide device; and isolation between the divided ports. To obtain a desired level of polarization purity, a waveguide device may be configured so that an axial ratio of a signal propagating through the waveguide device approaches unity and so that the excitement of signal components caused by higher order modes (e.g., electric and/or magnetic modes) in the waveguide device is reduced or avoided. The axial ratio may be evaluated from a ratio of a magnitude of a first component of the propagating signal and a magnitude of a second, orthogonal component of the propagating signal and a difference between the phase of the first component of the propagating signal and the phase of the second, orthogonal component of the propagating signal. An axial ratio of zero (0) dB may be associated with a signal having a circular polarization. Also, to avoid exciting higher order modes, the waveguide device may be configured to operate within a narrow bandwidth (e.g., 17.3 to 21.0 GHz). To achieve an axial ratio that approaches zero (0) dB and to avoid exciting higher order modes, septum configuration and a cross-sectional area for the waveguide device may be strategically selected. To improve the impedance matching and isolation metrics, additional modifications may be made to the cross-sectional area and/or septum configuration—e.g., at the expense of polarization purity.

Dual-band waveguide devices may be configured to operate across a wider bandwidth (e.g., 17.3 to 31.0 GHz), and the excitation of higher order modes for dual-band waveguide devices may be unavoidable. The excitement of higher order modes may degrade a polarization purity of signals propagating through the waveguide device and may also affect other characteristics including impedance matching between the common and divided ports as well as isolation between the divided ports. Modifying the cross-sectional area and septum configuration of a dual-band waveguide device may improve a performance of certain characteristics (e.g., impedance matching and/or port-to-port isolation) at the expense of polarization purity, and vice versa.

As disclosed herein, a housing of a dual-band waveguide device may be modified to enhance the RF response of the dual-band waveguide device while maintaining characteristics sought by a selected cross-sectional area and septum configuration for the dual-band waveguide device. That is, the cross-sectional area and septum configuration for a dual-band waveguide device may be selected to enhance certain characteristics (e.g., polarization purity) while modifications to the housing may be used to enhance other characteristics (e.g., impedance matching and port-to-port isolation) that mitigate the effects of supporting signals having a wide range of frequencies.

In some examples, the housing of the dual-band waveguide device may be configured to include a sidewall feature that extends around the interior of the dual-band waveguide device as an inset or outset step. The sidewall feature may be included in a common waveguide section or a polarizer section of the dual-band waveguide device. The sidewall feature may be symmetric—e.g., each portion of the sidewall feature may have a uniform width and each portion of the sidewall feature may be centered around a same point on a central axis of the dual-band waveguide device. By incorporating a symmetric sidewall feature around the inside perimeter of the dual-band waveguide device, characteristics of the dual-band waveguide device (e.g., impedance matching and port-to-port isolation) may be refined without affecting (or with minimal affect to) other characteristics of the dual-band waveguide device, such as polarization purity.

In some examples, the housing of the dual-band waveguide device may be further configured to include a second sidewall feature that extends around the interior of the dual-band waveguide device as an inset or outset step. The second sidewall feature may be included in a divided waveguide section or a polarizer section of the dual-band waveguide device. The second sidewall feature may similarly be symmetric and extend around the interior of the dual-band waveguide device as an inset or outset step. Alternatively, the second sidewall feature may be disposed on sidewalls of the dual-band waveguide device that run parallel with surfaces of the septum. By incorporating a second sidewall feature into the housing of the dual-band waveguide device, characteristics of the dual-band waveguide device (e.g., impedance matching and port-to-port isolation) may be further refined without affecting (or with minimal affect to) other characteristics of the dual-band waveguide device, such as polarization purity.

This description provides various examples of techniques for using a dual-band waveguide device having sidewall features, and such examples are not a limitation of the scope, applicability, or configuration of examples in accordance with the principles described herein. Rather, the ensuing description will provide those skilled in the art with an enabling description for implementing embodiments of the principles described herein. Various changes may be made in the function and arrangement of elements.

Thus, various embodiments in accordance with the examples disclosed herein may omit, substitute, or add various procedures or components as appropriate. For instance, it should be appreciated that the methods may be performed in an order different than that described, and that various steps may be added, omitted or combined. Also, aspects and elements described with respect to certain examples may be combined in various other examples. It should also be appreciated that the following systems, methods, devices, and software may individually or collectively be components of a larger system, wherein other procedures may take precedence over or otherwise modify their application.

FIG. 1A shows a three-dimensional cutaway view of an example dual-band waveguide device with sidewall features in accordance with various aspects of the present disclosure. For reference, a cutaway view 100-*a* of a waveguide device 105-*a* is shown relative to an X-axis 191-*a*, a Y-axis 192-*a*, and a Z-axis 193-*a*.

The waveguide device 105-*a* may include a common waveguide section 110-*a*, a divided waveguide section 160-*a*, and a polarizer section 120-*a*. The waveguide device 105-*a* may include a first set of opposing sidewalls 130-*a* and a second set of opposing sidewalls 140-*a* that make up the common waveguide section 110-*a*, the divided waveguide section 160-*a*, and the polarizer section 120-*a*. The waveguide device 105-*a* may also include a septum 150-*a*. A central axis 121-*a* may extend through the waveguide device 105-*a* along the Z-axis 193-*a*. Although the central axis 121-*a* is represented outside the waveguide device 105-*a* for clarity, the central axis 121-*a* can be interpreted as passing through the volume of the waveguide device 105-*a* including the polarizer section 120-*a* in the direction shown.

The waveguide device 105-*a* may have different electrical and magnetic field modes that affect a propagation of a signal through the waveguide device 105-*a*. The different modes may include transverse electric (TE) modes and transverse magnetic (TM) modes, such as a $TE_{01}$ mode, a $TE_{10}$ mode, a $TE_{11}$ mode, a $TM_{11}$ mode, a $TE_{20}$ mode, a $TE_{02}$ mode, a $TM_{21}$ mode. The $TE_{01}$ and $TE_{10}$ modes may be associated with the lowest cutoff frequency, $f_{c1}$, of the waveguide device 105-*a* and may be referred to as the dominant modes of the waveguide device 105-*a*. Signals received by the waveguide device 105-*a* having signal components with frequencies that are greater than the lowest cutoff frequency may at least excite the $TE_{01}$ and $TE_{10}$ modes in the waveguide device 105-*a*. Signals received by the waveguide device 105-*a* having signal components with frequencies that are below or near the lowest cutoff frequency may fail to excite any modes in the waveguide device 105-*a*, and thus, an attenuation of the signal in the waveguide device 105-*a* may approach infinity. The remaining modes may have higher cutoff frequencies than the dominant modes and may be referred to as higher-order modes. The $TE_{11}$ and $TM_{11}$ modes may have a cutoff frequency that is related to $f_{c1}$—e.g., $f_{c2}=f_{c1}*\sqrt{2}$. Signals received by the waveguide device 105-*a* having signal components with frequencies that are above the lowest cutoff frequency and below the next cutoff frequency may excite only the $TE_{01}$ and $TE_{10}$ modes. Signals received by the waveguide device 105-*a* having signal components with frequencies that are above a next cutoff frequency (e.g., $f_{c2}$) may excite the $TE_{01}$, $TE_{10}$, $TE_{11}$, and $TM_{11}$ modes.

To avoid the excitation of higher order modes in the waveguide device 105-*a*, the waveguide device 105-*a* may be configured to operate within a relative bandwidth that is based on the lowest cutoff frequency and the next higher cutoff frequency. For example, the waveguide device 105-*a* may be configured to operate in a relative bandwidth that is determined based on the following equation:

$$\frac{\sqrt{2}-1}{(\sqrt{2}+1)/2}=34.3\%.$$

To further enhance a performance of the waveguide device 105-*a*, the waveguide device 105-*a* may be configured to operate within a reduced relative bandwidth. For example, the communications may be configured to operate the waveguide device 105-*a* at a frequency that is at least 15% above the lowest cutoff frequency. Thus, the reduced relative bandwidth may be determined based on the following equation:

$$\frac{\sqrt{2}-1.15}{(\sqrt{2}+1.15)/2}=20.6\%.$$

The common waveguide section 110-*a* may have a rectangular (e.g., square) cross sectional opening, shown here as an opening in the x-y plane of the cutaway view 100-*a*. In other examples, the common waveguide section 110-*a* can have a different cross sectional shape or shapes that provide suitable opening and/or suitable coupling between the common waveguide section 110-*a* and the polarizer section 120-*a*, such as a trapezoid, a rhombus, a polygon, a circle, an oval, an ellipse, or any other suitable shape. In some examples, the common waveguide section 110-*a* may be coupled with an antenna element, such as an antenna horn element.

The divided waveguide section 160-*a* may be configured to isolate and separate left hand circularly polarized (LHCP) signals and right hand circularly polarized (RHCP) signals. The divided waveguide section 160-*a* may include a first divided waveguide 161-*a* that is associated with LHCP signals and a second divided waveguide 162-*a* that is associated with RHCP signals.

The polarizer section 120-*a* may combine/divide signals travelling between the common waveguide section 110-*a* and the divided waveguide section 160-*a* along the central axis 121-*a*. The polarizer section 120-*a* may be coupled between the common waveguide section 110-*a* and the divided waveguide section 160-*a*. The polarizer section 120-*a* can convert a signal that has one or more polarization states in the common waveguide section 110-*a* to two signal components in the individual divided waveguides that have respective orthogonal basis polarizations (e.g., LHCP signals, RHCP signals, etc.), or signal components in the individual divided waveguides to signals with a polarization state (e.g., LHCP, RHCP) in the common waveguide section.

The polarizer section 120-*a* can be configured in a manner that facilitates simultaneous dual-polarized operation. For example, from a signal dividing perspective, the polarizer section 120-*a* can be interpreted as receiving a signal having a combined polarization in the common waveguide section 110-*a*, and substantially transferring energy corresponding to a first basis polarization (e.g., LHCP) of the signal to the first divided waveguide 161-*a*, and substantially transferring energy corresponding to a second basis polarization (e.g., RHCP) of the signal to the second divided waveguide 162-*a*. From a signal combining perspective, the polarizer section 120-*a* can substantially transfer energy from the first divided waveguide 161-*a* to the common waveguide section 110-*a* as a wave having the first basis polarization, and also substantially transfer energy from the second divided waveguide 162-*a* to the common waveguide section 110-*a* as a wave having the second basis polarization such that a combined signal in the common waveguide section 110-*a* is transmitted as a wave having a combined polarization.

The first set of opposing sidewalls 130-*a* may include a first sidewall (which may be referred to as a bottom wall 131-*a*) and a second sidewall (which may be referred to as a top wall 132-*a*). The second set of opposing sidewalls 140-*a* may include a first sidewall 141-*a* and a second sidewall 142-*a* (not shown in FIG. 1A for the sake of clarity). The bottom wall 131-*a* and the top wall 132-*a* of the first set of opposing sidewalls 130-*a* may be parallel, planar surfaces, and on opposite sides of the central axis 121-*a*. The first sidewall 141-*a* and the second sidewall 142-*a* of the second set of opposing sidewalls 140-*a* may also be parallel, planar surfaces, and on opposite sides of the central axis 121-*a*. Thus, each of the first sidewall 141-*a* and the second sidewall 142-*a* of the second set of opposing sidewalls may be orthogonal with each of the bottom wall 131-*a* and the top wall 132-*a* of the first set of opposing sidewalls 130-*a*. In this manner, some examples of the waveguide device 105-*a* may have a polarizer section 120-*a* having a volume generally characterized by a rectangular prism. In other examples, the bottom wall 131-*a* and the top wall 132-*a* of the first set of opposing sidewalls may be non-parallel, and/or the first sidewall 141-*a* and the second sidewall 142-*a* of the second set of opposing sidewalls 140-*a* may be non-parallel. Furthermore, in various examples of the waveguide device 105-*a*, either of the bottom wall 131-*a* or the top wall 132-*a* of the first set of opposing sidewalls 130-*a* may be non-orthogonal with either of the first sidewall 141-*a* or the second sidewall 142-*a* of the second set of opposing sidewalls 140-*a*. Therefore, some examples of the waveguide device 105-*a* may have a polarizer section 120-*a* having a volume generally characterized by a rhombohedral prism, a trapezoidal prism, and the like. In other examples of the waveguide device 105-*a*, the polarizer section 120-*a* may have additional opposing or non-opposing sidewalls, and in such examples the polarizer section 120-*a* may have a volume generally characterized by a polygonal prism, a pyramidal frustum, and the like.

A septum 150-*a* may be disposed in the polarizer section 120-*a*, extending between the bottom wall 131-*a* and the top wall 132-*a* of the first set of opposing sidewalls 130-*a*. The septum 150-*a* can also have a first surface 151-*a* and a second surface 152-*a* (on the back side of septum 150-*a* in cutaway view 100-*a*). In some examples, one or both of the first surface 151-*a* and the second surface 152-*a* of the septum 150-*a* can be planar, and in some examples the first surface 151-*a* and the second surface 152-*a* can both be parallel to the central axis 121-*a* (e.g., in the X-Z plane of cutaway view 100-*a*). The thickness of the septum 150-*a* between the first surface 151-*a* and the second surface 152-*a* can vary from embodiment to embodiment. The thickness of the septum 150-*a* may be significantly smaller than the dimensions of a cavity of the polarizer section 120-*a*. In some examples, the height (e.g., along the Y-axis 192-*a*) or width (e.g., along the X-axis 191-*a*) of a cross-section of the waveguide device 105-*a* can be at least ten times greater than the thickness of the septum 150-*a*. The septum 150-*a* can have a uniform or non-uniform thickness (e.g., tapered).

The septum 150-*a* provides a boundary between a first divided waveguide 161-*a* and a second divided waveguide 162-*a* and has different effects on different modes of signal propagation in the polarizer section 120-*a* based on their orientation relative to the septum 150-*a*. For example, an RHCP or LHCP signal propagating in the negative Z-axis direction (toward the divided waveguide section 160-*a*) through common waveguide section 110-*a* may be understood as having a $TE_{10}$ mode component signal with its E-field along X-axis 191-*a* and a $TE_{01}$ mode component signal with its E-field along Y-axis 192-*a* having equal amplitudes but offset in phase. As the signal propagates through the polarizer section 120-*a*, the septum 150-*a* acts as a power divider to the $TE_{10}$ mode component signal. However, to the $TE_{01}$ mode component signal, the polarizer section 120-*a* with septum 150-*a* acts like a ridge loaded waveguide with a short aligned with the strongest E-field portion. The ridge-loading effect of the septum 150-*a* effectively increases the electrical length of the polarizer section 120-*a* for the $TE_{01}$ mode component signal, which facilitates phase change and conversion of the $TE_{01}$ mode component signal relative to the $TE_{10}$ mode component signal. As the signal reaches the divided waveguide section 160-*a*, the converted $TE_{01}$ mode component signal may be additively combined with the $TE_{10}$ mode component signal on one side of the septum 150-*a*, while cancelling the $TE_{10}$ mode component signal on the other.

For example, as a received signal wave having LHCP propagates from the common waveguide section 110-*a* through the polarizer section 120-*a*, the $TE_{01}$ mode component signal may, after conversion in the polarizer section 120-*a*, additively combine with the $TE_{10}$ mode component signal on the side of the septum 150-*a* coupled with the first divided waveguide 161-*a*, while cancelling each other on the side of the septum 150-*a* coupled with the second divided waveguide 162-*a*. Similarly, a signal wave having RHCP may have $TE_{01}$ and $TE_{10}$ mode component signals that additively combine on the side of the septum 150-*a* coupled with the second divided waveguide 162-*a* and cancel each other on the side of the septum 150-*a* coupled with the first divided waveguide 161-*a*. Thus, the first divided waveguide 161-*a* and the second divided waveguide 162-*a* may be excited by orthogonal basis polarizations of polarized waves incident on the common waveguide, and may be isolated from each other. In a transmission mode, excitations of the first divided waveguide 161-*a* and the second divided waveguide 162-*a* (e.g., $TE_{10}$ mode signals) may result in corresponding LHCP and RHCP waves, respectively, emitted from the common waveguide section 110-*a*.

The waveguide device 105-*a* may be used to transmit or receive linearly polarized signals having a desired polarization tilt angle at the common waveguide section 110-*a* by changing the relative phase of component signals transmitted or received via the first divided waveguide 161-*a* and second divided waveguide 162-*a*. For example, two equal-amplitude components of a signal may be suitably phase shifted and sent separately to the first divided waveguide 161-*a* and the second divided waveguide 162-*a* of the waveguide device 105-*a*, where they are converted to an LHCP wave and an RHCP wave at the respective phases by the polarizer section 120-*a*. When emitted from the common waveguide section 110-*a*, the LHCP and RHCP waves combine to produce a linearly polarized wave having an orientation at a tilt angle related to the phase shift introduced into the two components of the transmitted signal. The transmitted wave is therefore linearly polarized and can be aligned with a polarization axis of a communication system. In some instances, the waveguide device 105-*a* may operate in a transmission mode for a first polarization (e.g., LHCP, first linear polarization) while operating in a reception mode for a second, orthogonal polarization (e.g., RHCP, second linear polarization).

A quality of the RF response of the waveguide device 105-*a* may be determined based on an impedance matching metric between the common and divided waveguide ports, the isolation between the divided waveguide ports (which may also be referred to as "port-to-port isolation"), a polarization purity provided by the waveguide device 105-*a*, a frequency response of the waveguide device, and the like. The impedance matching characteristics of the waveguide device 105-*a* may change as a function of frequency—thus, the impedance matching characteristics may be preferred within a certain range of frequencies. The port-to-port isolation may be determined based on an amount of cross-polarization experienced by a divided waveguide port associated with a first type of polarization (e.g., LHCP) from signals of another type of polarization (e.g., RHCP) for the other divided waveguide port. The polarization purity may be determined based on an axial ratio of the polarization ellipse formed by the $TE_{01}$ and $TE_{10}$ modes at the common waveguide port and the level of excitement of the higher-order modes in the waveguide device 105-*a*.

In some examples, the polarization purity is increased when the axial ratio approaches unity (i.e., 0 dB) and/or the excitement of the higher-order modes is reduced or prevented. The magnitude of the axial ratio may be based on the magnitude of the $TE_{01}$ and $TE_{10}$ mode component signals and the phase shift between the $TE_{01}$ and $TE_{10}$ mode component signals—e.g., the axial ratio may be equal to one when the ratio of the magnitude of the $TE_{01}$ and $TE_{10}$ mode component signals is equal to one and the phase shift between the $TE_{01}$ and $TE_{10}$ mode component signals is equal to 90 degrees. In some cases, an axial ratio of less than one (1) dB corresponds to a cross-polarization discrimination of less than 24.8 dB. A level of port-to-port isolation may be associated with the level of cross-polarization discrimination.

A cross-sectional size of the waveguide device 105-*a* may be configured to reduce the excitation of the higher-order modes. After the cross-sectional size of the waveguide device 105-*a* is selected, the characteristics of the RF response (e.g., port-to-port isolation) of the waveguide device 105-*a* may be enhanced (or further enhanced for polarization purity) based on a construction of the septum 150-*a*. For example, the profile of the septum 150-*a* may be configured with a length and multiple stepped surfaces of varying heights that enhance the RF response of the waveguide device 105-*a*. In some examples, the septum 150-*a* is configured to optimize certain characteristics of the RF response (e.g., axial ratio). In some examples, the septum 150-*a* optimizes certain characteristics of the RF response (e.g., port-to-port isolation and/or impedance matching) at the expense of other characteristics of the RF response (e.g., axial ratio).

After selecting the cross-sectional size of the waveguide device and a configuration of the septum 150-*a*, the housing of the waveguide device 105-*a* may be modified to enhance other characteristics of the RF response (e.g., a frequency response) of the waveguide device 105-*a*. The housing of the waveguide device 105-*a* may include first sidewall 141-*a*, second sidewall 142-*a*, bottom wall 131-*a*, top wall 132-*a*, as well as a first and second face at both ends of the waveguide device 105-*a*. The housing of the waveguide device 105-*a* may also include an insert for the septum 350-*a*. In some examples, periodically corrugated waveguide sections may be incorporated into opposing sidewalls of the housing to manage the differential phase shift between the $TE_{01}$ and $TE_{10}$ mode component signals. The opposing sidewalls including the periodically corrugated waveguide sections may be perpendicular to the septum 150-*a*. That is, the housing of the waveguide device 105-*a* may be configured so that the frequency dependence of the differential phase shift between the $TE_{01}$ and $TE_{10}$ mode component signals caused by the housing is opposite to the different phase shift between the $TE_{01}$ and $TE_{10}$ mode component signals caused by the septum 150-*a*. Accordingly, a nearly constant phase characteristic for the waveguide device 105-*a* may be achieved over a wider frequency band. In some examples, modifications to (or applied on) the sidewalls of the housing of the waveguide device 105-*a* may be referred to as sidewall features. In some examples, characteristics of the waveguide device 105-*a* (e.g., port-to-port isolation, axial ratio, impedance matching, etc.) may be degraded based on incorporating sidewall features on a set of opposing sidewalls.

In some examples, the waveguide device 105-*a* may be a dual-band device. That is, the waveguide device 105-*a* may be configured to support the communication using two carrier frequencies. In some examples, the waveguide device 105-*a* may be used to receive signals in a lower frequency band (e.g., 17.3 to 21.2 GHz) using a first carrier frequency and transmit signals in a higher frequency band (e.g., 27.5 to 31.0 GHz) using a second carrier frequency—e.g., when used in a ground segment of a satellite communications system. In some examples, the waveguide device 105-*a* may be used to transmit signals in a lower frequency band (e.g., 17.3 to 21.2 GHz) using a first carrier frequency and receive signals in a higher frequency band (e.g., 27.5 to 31.0 GHz) using a second carrier frequency—e.g., when used in the space segment. Thus, the waveguide device 105-*a* may be configured to operate in a wider composite bandwidth than if the waveguide device 105-*a* was configured to operate in one of the frequency bands—e.g., the waveguide device 105-*a* may be configured to operate in a composite bandwidth of 17.3 to 31.0 GHz, which corresponds to a relative bandwidth of around 56.7%.

Accordingly, when the waveguide device 105-*a* is used as a dual-band waveguide device, excitation of higher-order modes in the waveguide device 105-*a* (e.g., a waveguide device that is configured to operate in a relative bandwidth of 20.6%) may be unavoidable. The excitation of the higher-order modes in the waveguide device 105-*a* may degrade the polarization purity of device, may cause a reduction in the port-to-port isolation between divided waveguide ports, or may imbalance the impedances of the common waveguide port and the divided waveguide ports. Thus, the excitation of the higher-order modes in the waveguide device 105-*a* may cause transmissions from the waveguide device 105-*a* to interfere with other devices (e.g., nontargeted satellites)—e.g., when used in the ground segment. The increased interference caused by the waveguide device 105-*a* may result from an increased number, and increased excitation levels, of cross-polarized field components within the waveguide device 105-*a*, and thus, an increase in off-boresight cross-polarized radiation of antennas coupled with the waveguide device 105-*a*.

To increase a quality of the RF response of a dual-band waveguide device, such as waveguide device 105-*a*, the housing of the waveguide device 105-*a* may be modified to enhance characteristics of the RF response (e.g., impedance matching, port-to-port isolation, and/or polarization purity) resulting from the cross-sectional area and septum configuration of the dual-band waveguide device. In some examples, the housing of the waveguide device 105-*a* may be configured to include a sidewall feature 155-*a* that extends around the interior of the waveguide device 105-*a* as an inset or outset step—in the cutaway view of FIG. 1A, the sidewall feature 155-*a* is shown extending around a portion of bottom wall 331-*a*, first sidewall 341-*a*, and a portion of top wall 332-*a*. The sidewall feature 155-*a* may be positioned along the central axis 121-*a* of the waveguide device 105-*a* at a location within the common waveguide section 110-*a*. The sidewall feature 155-*a* may be symmetric around the location on the central axis 121-*a*—e.g., each face of the sidewall feature 155-*a* may be centrally aligned with one another and/or have a same width. In some examples, the sidewall feature 155-*a* may be positioned at least partially within the polarizer section 120-*a*.

Thus, the cross-sectional area and septum configuration may be selected to achieve a first level of impedance matching, port-to-port isolation, and polarization purity of a dual-band waveguide device, while the sidewall feature 155-*a* may be used to refine the impedance matching and port-to-port isolation characteristics of the waveguide device 105-*a* with little (or no) effect to the polarization purity characteristic. That is, a first and second edge of the sidewall feature 155-*a* may introduce an impedance inhomogeneity that causes a small RF signal reflection that goes back to the divided waveguide ports. Thus, with proper positioning, the impedance introduced by the sidewall feature 155-*a* may be used to refine an impedance matching metric between the common waveguide port and divided waveguide ports and/or to increase an isolation between the divided waveguide ports. Moreover, by using a symmetric sidewall feature, certain characteristics like the axial ratio obtained by the cross-sectional/septum configuration may be maintained—e.g., because the dominant modes $TE_{10}$ and $TE_{01}$ may be equally affected by the addition of the sidewall feature 155-*a*.

Figure 1B:
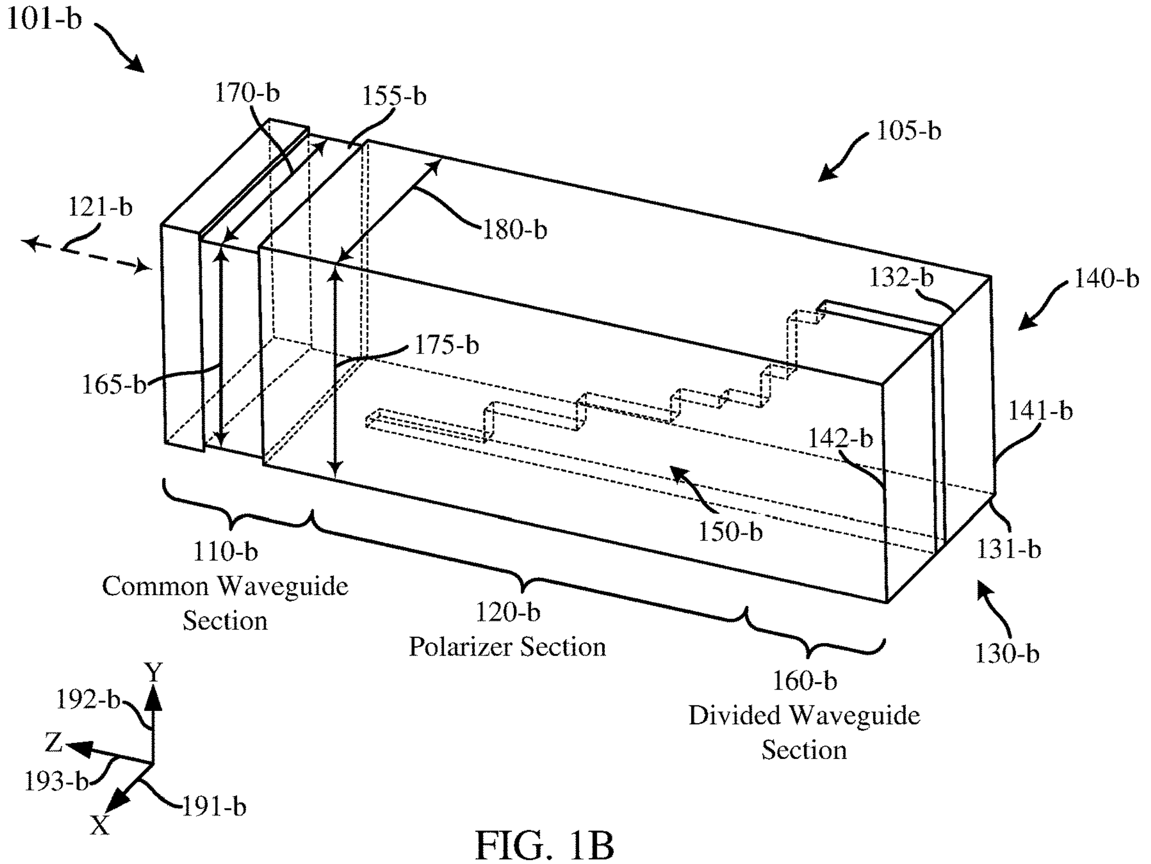

FIG. 1B shows a three-dimensional view of an example dual-band waveguide device with sidewall features in accordance with various aspects of the present disclosure. For reference, an exterior view 101-*b* of a waveguide device 105-*b* is shown relative to an X-axis 191-*b*, a Y-axis 192-*b*, and a Z-axis 193-*b*. The waveguide device 105-*b* may be, or may be similarly constructed as, the waveguide device 105-*a* depicted in FIG. 1A.

The waveguide device 105-*b* may be a dual-band waveguide device. To enhance an operation of the waveguide device 105-*b*, a sidewall feature 155-*b* may be incorporated into each of the sidewalls (e.g., bottom wall 131-*b*, top wall 132-*b*, first sidewall 141-*b*, and second sidewall 142-*b*) of the waveguide device 105-*b*. In some examples, the sidewalls of the sidewall feature 155-*b* may be referred to separately from the first set of opposing sidewalls 130-*b* and the second set of opposing sidewalls 140-*b*—e.g., the sidewalls of the sidewall feature 155-*b* may be referred to as a third set of opposing sidewalls and a fourth set of opposing sidewalls of the waveguide device 105-*b*.

In some examples, the sidewall feature 155-*b* may be referred to as including a first portion on the bottom wall 131-*b*, a second portion on the first sidewall 141-*b*, a third portion on the top wall 132-*b*, and a fourth portion on the second sidewall 142-*b*. The sidewall feature 155-*b* may be symmetric around a common point along the central axis 121-*b*. That is, a middle of the first, second, third, and fourth portion of the sidewall feature may be aligned with one another and a common point along the central axis 121-*b*. Also, a width of the first, second, third, and fourth portion of the sidewall feature may be the same (or nearly identical).

The sidewall feature 155-*b* may extend across the inside perimeter of the waveguide device 105. The sidewall feature 155-*b* may include a first edge that is closer to a divided end of the waveguide device 105-*b* and a second edge that is closer to a common end of the waveguide device 105-*b*. Both the first and second edges may similarly extend around the inside perimeter of the waveguide device 105. The sidewall feature 155-*b* can have a width in a direction along the central axis 121-*b* (e.g., along the Z-axis 193-*b*). The width of the sidewall feature 155-*b* may be measured between the first and second edges of the sidewall feature 155-*b*. The sidewall feature 155-*b* may maintain a fixed (or nearly fixed) width across the inside perimeter of the waveguide device 105-*b*. That is, each portion of the sidewall feature 155-*b* may have a same (or nearly identical) width. In some examples, the width of the sidewall feature 155-*b* may have a particular relationship with an operational frequency of the waveguide device 105-*b*. For example, the width of the sidewall feature 155-*b* may be between one-tenth and one-half of a wavelength of an operational frequency of the waveguide device 105-*b*. In some examples, the width of the sidewall feature 155-*b* may be approximately 2.6 millimeters for an operational frequency range of 17.3 to 31.0 GHz.

The sidewall feature 155-*b* may either form an inset or an outset in each of the first set of opposing sidewalls 130-*b* and the second set of opposing sidewalls 140-*b*. An inset in a sidewall may be understood as forming a step in the sidewall projecting inwardly (relative to the waveguide volume) from the plane of the sidewall. For example, the sidewall feature 155-*b* may form an inward step around the interior of the waveguide device 105-*b* projecting into the center of the waveguide device 105-*b*. Thus, the sidewall feature 155-*b* may have a height in a direction extending into the waveguide device 105-*b* (e.g., along the X-axis 191-*b* or the Y-axis 192-*b*), measured from the plane of the sidewall upon which the sidewall feature 155-*b* is located. In some examples, the height of the sidewall feature 155-*b* may have a particular relationship with an operational frequency of the waveguide device 105-*b*. For example, a height of the sidewall feature 155-*b* may be less than one-tenth of a wavelength of an operational frequency of the waveguide device 105-*b*. In some examples, the height of the sidewall feature 155-*b* may be less than 0.5 millimeters for an operational frequency range of 17.3 to 31.0 GHz. In some examples, the height of the sidewall feature 155-*b* may vary along the central axis. In some examples, the sidewall feature 155-*b* is implemented by disposing a material (e.g., conductive material, dielectric material) on the interior of the waveguide device 105-*b* rather than forming a step in the sidewalls in the waveguide device 105-*b*—that is, the sidewalls of the waveguide device extend from one end to the other without interruption.

An outset in a sidewall may be understood as forming a recess or cavity in a sidewall projecting outwardly (relative to the waveguide volume) from the plane of the sidewall. For example, the sidewall feature 155-*b* may form a cavity around the interior of the waveguide device 105-*b* projecting away from the center of the waveguide device 105-*b*. Thus, the sidewall feature 155-*b* may have a depth in a direction extending from the waveguide device 105-*b* (e.g., along the X-axis 191-*b* or the Y-axis 192-*b*), measured from the plane of the sidewall upon which the sidewall feature 155-*b* is located. In some examples, the depth of the sidewall feature 155-*b* may have a particular relationship with an operational frequency of the waveguide device 105-*b*. For example, a depth of the sidewall feature 155-*b* may be less than one-tenth of a wavelength of an operational frequency of the waveguide device 105-*b*. In some examples, the depth of the sidewall feature 155-*b* may be less than 0.5 millimeters for an operational frequency range of 17.3 to 31.0 GHz. In some examples, the depth of the sidewall feature 155-*b* may vary along the central axis.

Thus, the sidewall feature 155-*b* can have a first length 165-*b* in a direction between the bottom wall 131-*b* and the top wall 132-*b* of the first set of opposing sidewalls 130-*b* (e.g., along the X-axis 191-*b*). And the sidewall feature 155-*b* can have a second length 170-*b* in a direction between the first sidewall 141-*b* and the second sidewall 142-*b* of the second set of opposing sidewalls 140-*b* (e.g., along the Y-axis 192-*b*). Thus, the sidewall feature 155-*b* may have a first length 165-*b* that is less than or greater than a third length 175-*b* between the bottom wall 131-*b* and the top wall 132-*b* of the first set of opposing sidewalls 130-*b* and a second length 170-*b* that is less than or greater than a fourth length 180-*b* between the first sidewall 141-*b* and the second sidewall 142-*b* of the second set of opposing sidewalls 140-*b*. A cross-sectional area of the waveguide device 105-*b* may be based on the third length 175-*b* and the fourth length 180-*b*.

Also, the first set of opposing sidewalls 130-*b* of the waveguide device 105-*b* may be separated by a first distance at positions along the central axis 121-*b* that are non-overlapping with the sidewall feature 155-*b*. Also, the second set of opposing sidewalls 140-*b* may be separated by a second distance at positions along the central axis 121-*b* that are non-overlapping with the sidewall feature 155-*b*. The first set of opposing sidewalls 130-*b* may be separated by a third distance at positions along the central axis 121-*b* that overlap with the sidewall feature 155-*b*. In some examples, the third distance is smaller than the first distance—e.g., when sidewall feature 155-*b* is inset. In other examples, the third distance is greater than the first distance—e.g., when sidewall feature 155-*b* is outset. The fourth set of opposing sidewalls 140-*b* may be separated by a fourth distance at positions along the central axis 121-*b* that overlap with the sidewall feature 155-*b*. In some examples, the fourth distance is smaller than the second distance—e.g., when sidewall feature 155-*b* is inset. In other examples, the fourth distance is greater than the second distance—e.g., when sidewall feature 155-*b* is outset.

In either case (e.g., if the sidewall feature 155-*a* is inset or outset), an angle between a sidewall of the waveguide device and a corresponding edge of the sidewall feature may be between 40 and 90 degrees. For example, an angle between top wall 132-*b* and a first edge of the third portion of the sidewall feature 155-*a* may be between 40 and 90 degrees. Similarly, an angle between top wall 132-*b* and a second edge of the third portion of the sidewall feature 155-*a* may be between 40 and 90 degrees.

The sidewall feature 155-*b* may be positioned along a portion of the central axis 121-*b* that does not overlap with a portion of the central axis 121-*b* that is included within the divided waveguide section 160-*b*. That is, the sidewall feature 155-*b* may be fully positioned within the common waveguide section 110-*b* or fully positioned within the polarizer section 120-*b*. In some examples, the sidewall feature 155-*b* may be partially positioned within the common waveguide section 110-*b* and partially positioned within the polarizer section 120-*b*—that is, a first edge of the sidewall feature 155-*b* may be positioned within polarizer section 120-*b* and a second edge of the sidewall feature 155-*b* may be positioned within common waveguide section 110-*b*. When the sidewall feature 155-*b* is positioned (partially or fully) within the polarizer section 120-*b*, an inset or outset may be introduced into a bottom of the septum 150-*b* that is coincident with the bottom wall 131-*b*.

In some examples, a position of the sidewall feature 155-*b* may be determined based on an impedance matching metric between the common waveguide port and the divided waveguide ports and/or a port-to-port isolation metric between the divided waveguide ports. For example, the sidewall feature 155-*b* may be positioned to maximize a port-to-port isolation between the divided waveguide ports, improve an impedance match between the common waveguide port and the divided waveguide ports, or a combination thereof. A method for determining a position of the sidewall feature 155-*b* is described in more detail herein and with reference to FIG. 6.

Figure 2:
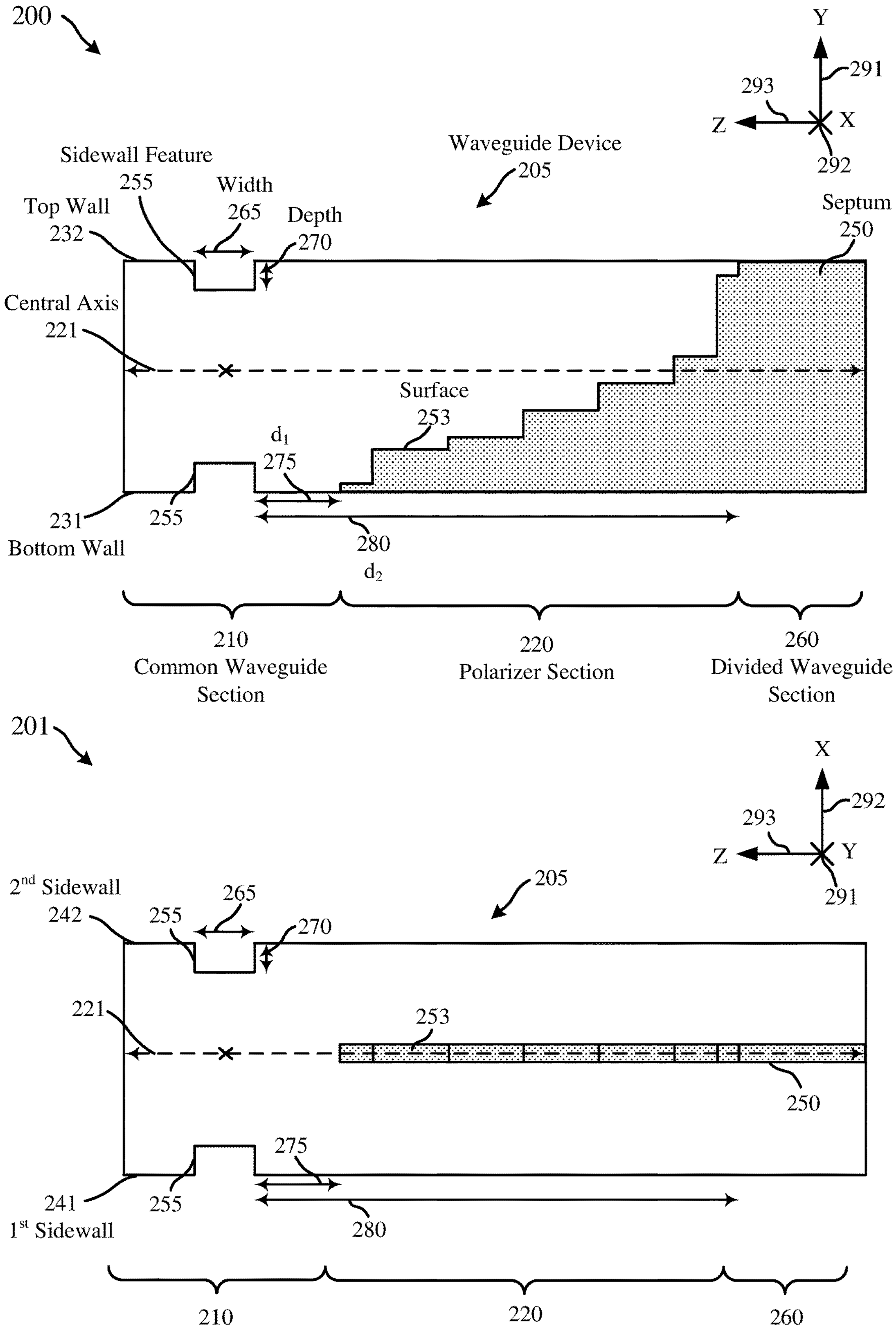
FIG. 2 shows cross-sectional views of an example dual-band waveguide device with sidewall features in accordance with various aspects of the present disclosure.

FIG. 2 shows cross-sectional views of a dual-band waveguide device with sidewall features in accordance with various aspects of the present disclosure. The first cross-sectional view 200 depicts a waveguide device 205 in the Y-Z plane. The second cross-sectional view 201 depicts the waveguide device 205 in the X-Z plane.

The waveguide device 205 may include common waveguide section 210, polarizer section 220, and divided waveguide section 260. Waveguide device 205 may also include top wall 232, bottom wall 231, first sidewall 241, and second sidewall 242. A central axis 221 of waveguide device 205 may run from one end of the waveguide device 205 to the other. Waveguide device 205 may also include a septum 250, which may include multiple stepped surfaces, such as surface 253. A sidewall feature 255 may also be included on, or as part of, the sidewalls of the waveguide device 205.

As shown by the first cross-sectional view 200 and the second cross-sectional view 201, the sidewall feature 255 may be one contiguous feature (e.g., an inset or outset step) that extends around the perimeter of the waveguide device 205. In some examples, the sidewall feature 255 is implemented by incorporating an inset step into the bottom wall 231, the top wall 232, the first sidewall 241, and the second sidewall 242 of the waveguide device 205. In other examples, the sidewall feature 255 is implemented by disposing material (e.g., conductive material, dielectric material) on the bottom wall 231, the top wall 232, the first sidewall 241, and the second sidewall 242 of the waveguide device 205; in which case, the bottom wall 231, the top wall 232, the first sidewall 241, and the second sidewall 242 may extend uninterrupted from one end of the waveguide device 205 to the other end.

A center of the sidewall feature 255 may be positioned at a point along the central axis 221 (e.g., the point represented by the X in FIG. 2). A width 265 of the sidewall feature may remain constant (or nearly constant) across the perimeter of the waveguide device 205. In some examples, the width 265 may be between one-tenth and one-half of a wavelength of an operational frequency of the waveguide device 205. Thus, the sidewall feature 255 may be symmetric around the point along the central axis 221. A depth 270 of the sidewall feature may also be uniform across the perimeter of the waveguide device 205. In some examples, the depth 270 may be between less than one-tenth of a wavelength of an operational frequency of the waveguide device 205. In some examples, the depth 270 varies from one end of the sidewall feature 255 to the other end of the sidewall feature 255—e.g., a depth of the first edge may be less than a depth of the second edge, or vice versa.

As shown in FIG. 2, the sidewall feature 255 may be located entirely within the common waveguide section 210. In some examples, a first edge of the sidewall feature 255 is positioned a first distance 275 (which may also be referred to as $d_1$) from an end of the polarizer section 220 (and/or an end of the septum 250). In some examples, a first edge of the sidewall feature 255 is positioned a second distance 280 (which may also be referred to as $d_2$) from a beginning of the polarizer section 220. Although the sidewall feature 255 is depicted as being entirely within the common waveguide section 210 in FIG. 2, the sidewall feature 255 may be located anywhere within a larger section comprising the common waveguide section 210 and the polarizer section 220. In some examples, the sidewall feature 255 may be located partially within the common waveguide section 210 and partially within the polarizer section 220. In some examples, the sidewall feature 255 may be located entirely within the polarizer section 220.

When the sidewall feature 255 is located, fully or partially, within the polarizer section 220, the septum 250 may be modified to accommodate the sidewall feature 255. For example, if the sidewall feature 255 is located along the central axis 221 at a point that is aligned with surface 253, the septum 250 may be modified so that an inset is included in a portion of the septum 250 located below surface 253. Alternatively, if the sidewall feature 255 is outset from the waveguide device 205, the septum 250 may be modified so that the septum 250 includes an outset at a position located below surface 253.

In some examples, an enhancement of an impedance matching characteristic between the common port of the waveguide device 205 and the divided ports of the waveguide device 205 is based on the width 265 and depth 270 of the sidewall feature 255. Also, an enhancement of an isolation metric between the divided ports of the waveguide device 205 may be based on the first distance 275 between the sidewall feature 255 and the end of the polarizer section 220. The enhancement of the impedance matching and port-to-port isolation characteristics between may be further based on the second distance 280 between the sidewall feature 255 and the beginning of the polarizer section 220. When the sidewall feature 255 is positioned within the common waveguide section 210, the enhancement of the impedance matching and port-to-port isolation characteristics between may be further based on the first distance 275 between the sidewall feature 255 and the end of the polarizer section 220 (and/or the end of the septum 250).

Figure 3A:
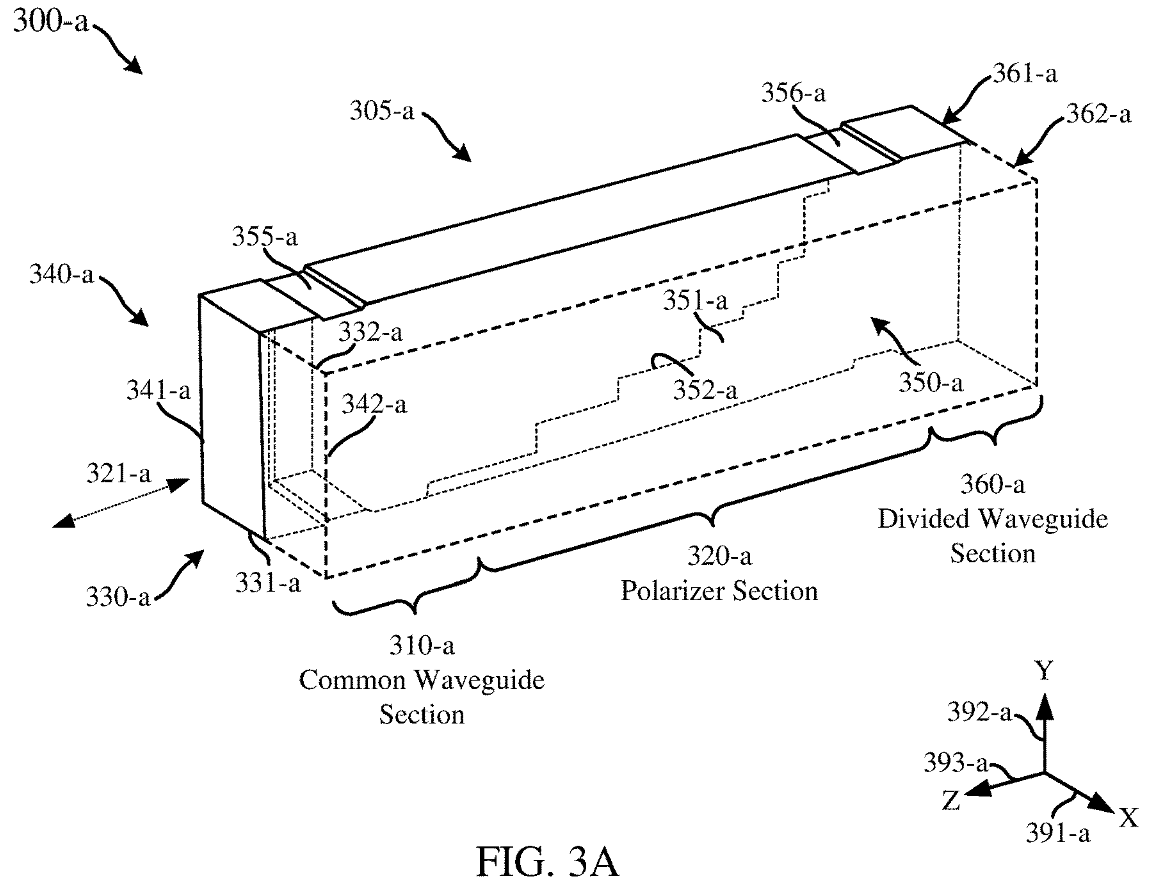
FIGS. 3A and 3B show three-dimensional views of an example dual-band waveguide device with sidewall features in accordance with various aspects of the present disclosure.

FIG. 3A shows a three-dimensional cutaway view of an example dual-band waveguide device with sidewall features in accordance with various aspects of the present disclosure. For reference, a cutaway view 300-*a* of the waveguide device 305-*a* is shown relative to an X-axis 391-*a*, a Y-axis 392-*a*, and a Z-axis 393-*a*.

Similar to the waveguide devices described with reference to FIGS. 1A and 1B, the waveguide device 305-*a* may include a common waveguide section 310-*a*, a divided waveguide section 360-*a*, and a polarizer section 320-*a*. The waveguide device 305-*a* may include a first set of opposing sidewalls 330-*a* and a second set of opposing sidewalls 340-*a* that make up the common waveguide section 310-*a*, the divided waveguide section 360-*a*, and the polarizer section 320-*a*. The waveguide device 305-*a* may also include a septum 350-*a*. A central axis 321-*a* may extend through the waveguide device 305-*a* along the Z-axis 393-*a*. Additionally, the waveguide device 305-*a* may include a first sidewall feature 355-*a*.

As discussed herein, the first sidewall feature 355-*a* may be used to enhance an RF response of a dual-band waveguide device, such as waveguide device 305-*a*—e.g., by refining an impedance matching metric and/or port-to-port isolation metric. To further increase a quality of the RF response of a dual-band waveguide device, the housing of the waveguide device 305-*a* may be further modified. For example, the housing of the waveguide device 305-*a* may be configured to include a second sidewall feature 356-*a*. In some examples, the second sidewall feature 356-*a* may extend around the interior of the waveguide device 305-*a*. The second sidewall feature 356-*a* may be positioned along the central axis 321-*a* at a location within the divided waveguide section 360-*a*. The second sidewall feature 356-*a* may be symmetric around the location on the central axis 321-*a*—e.g., each face of the second sidewall feature 356-*a* may be centrally aligned with one another and/or have a same width.

The second sidewall feature 356-*a* may be used to refine the impedance matching and port-to-port isolation characteristics of the waveguide device 305-*a* by introducing separate impedance inhomogeneities in the divided waveguide ports. Thus, with proper positioning, the impedance introduced by the second sidewall feature 356-*a* may be used to refine an impedance matching metric between the common waveguide port and divided waveguide ports and/or to increase an isolation between the divided waveguide ports. As is the case for the first sidewall feature 355-*a*, the adjustments to the impedance matching and port-to-port isolation may be accomplished with minimal changes being caused to the axial ratio obtained by the cross-sectional/septum configuration—e.g., because the dominant modes $TE_{10}$ and $TE_{01}$ may be equally affected by the addition of the second sidewall feature 356-*a*.

The introduction of the second sidewall feature 356-*a* may result in a modification to the septum 350-*a*. For example, the septum 350-*a* may be configured to include an inset or outset in a bottom and top portion that is coincident with the second sidewall feature 356-*a*. In some examples, after cross-sectional area for the waveguide device 305-*a* is selected, a profile for the septum 350-*a* that accommodates the second sidewall feature 356-*a* may be determined. After determining the cross-sectional area and septum profile, a structure and positioning of the first sidewall feature 355-*a* may be determined to optimize an impedance matching metric between the common waveguide port and the divided waveguide ports.

Figure 3B:
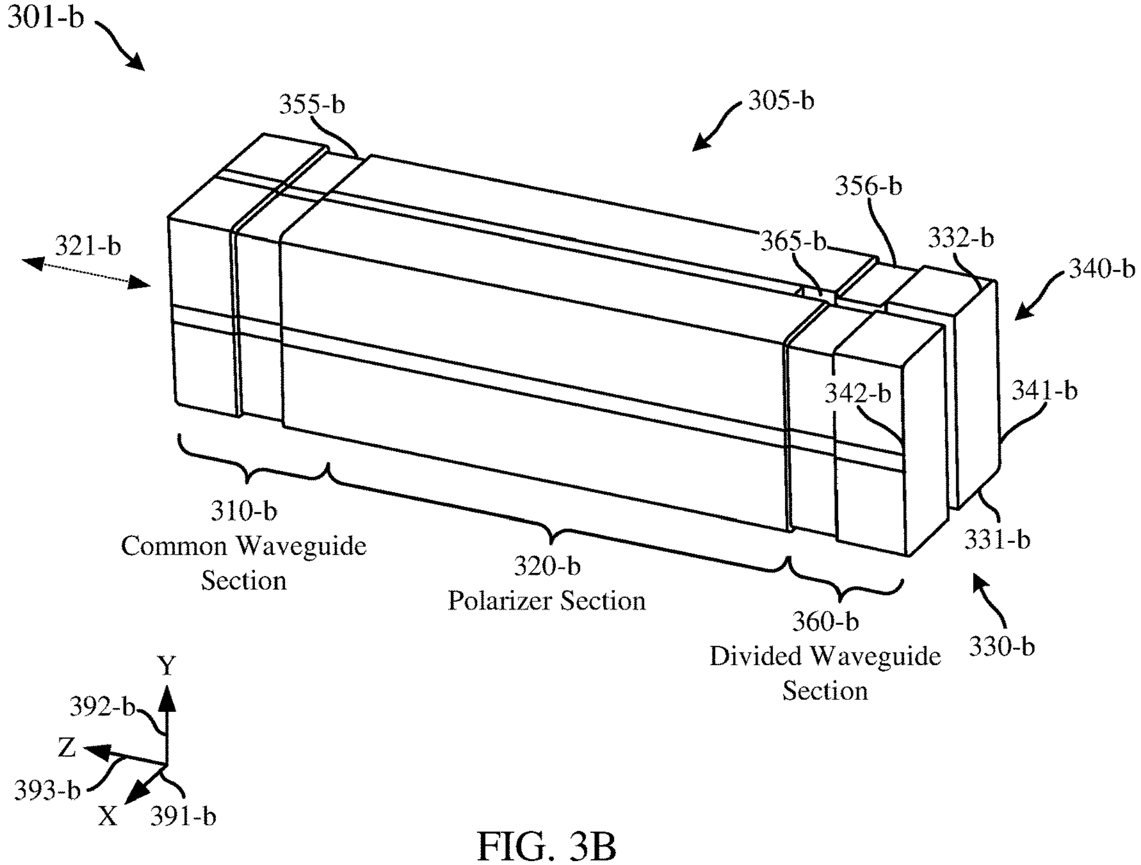

FIG. 3B shows a three-dimensional view of an example dual-band waveguide device with sidewall features in accordance with various aspects of the present disclosure. For reference, the waveguide device 305-*b* is shown relative to an X-axis 391-*b*, a Y-axis 392-*b*, and a Z-axis 393-*b*. The waveguide device 305-*b* may be, or may be an example of, the waveguide device 305-*a* depicted in FIG. 3A. The waveguide device 305-*b* may include a slot 365-*b* for inserting a septum into the waveguide device 305-*b*. The waveguide device may include a first sidewall feature 355-*b*, which may be similar to a sidewall feature 155 as described with reference to FIGS. 1A and 1B.

To further enhance an operation of the waveguide device 305-*b*, a second sidewall feature 356-*b* may be incorporated into the waveguide device 305-*b*, in addition to the first sidewall feature 355-*b*. In some examples, the second sidewall feature 356-*b* is incorporated into each of the sidewalls (e.g., bottom wall 331-*b*, top wall 332-*b*, first sidewall 341-*b*, and second sidewall 342-*b*) of the waveguide device 305-*b*. In other examples, the second sidewall feature 356-*b* is incorporated into a subset of the sidewalls (e.g., first sidewall 341-*b* and second sidewall 342-*b*) of the waveguide device 305-*b*.

In some examples, the sidewalls of the second sidewall feature 356-*b* may be referred to separately from the first set of opposing sidewalls 330-*b* and the second set of opposing sidewalls 340-*b*—e.g., the sidewalls of the second sidewall feature 356-*b* may be referred to as a third set of opposing sidewalls and a fourth set of opposing sidewalls of the waveguide device 305-*b*. In some examples, the second sidewall feature 356-*b* may be referred to as including a first portion on the bottom wall 331-*b*, a second portion on the first sidewall 341-*b*, a third portion on the top wall 332-*b*, and a fourth portion on the second sidewall 342-*b*. In some examples, the second sidewall feature 356-*b* may be referred to as including a first portion on the first sidewall 341-*b* and a second portion on the second sidewall 342-*b*.

The second sidewall feature 356-*b* may be similarly constructed as the first sidewall feature 355-*b*. That is, the second sidewall feature 356-*b* may be symmetric around a point on the central axis 321-*b*, extending around the inside perimeter of the waveguide device 305-*b* and having a fixed width. The second sidewall feature 356-*b* may be either inset or outset from the exterior of the waveguide device. Also, a width and height of the second sidewall feature 356-*b* may be based on an operational frequency range (e.g., 17.3 to 31.0 GHz) of the waveguide device 305-*b*. An angle between a sidewall of the waveguide device and the second sidewall feature 356-*b* may be between 40 and 90 degrees.

The second sidewall feature 356-*b* may be fully positioned within the polarizer section 320-*b* or fully positioned within the divided waveguide section 360-*b*. In some examples, the second sidewall feature 356-*b* may be partially positioned within the polarizer section 320-*b* and partially positioned within the divided waveguide section 360-*b*—that is, a first edge of the second sidewall feature 356-*b* may be positioned within divided waveguide section 360-*b* and a second edge of the second sidewall feature 356-*b* may be positioned within polarizer section 320-*b*. In some cases, an inset or outset may be introduced into a portion of the bottom and/or top of the septum 350 is coincident with the bottom wall 331-*b* and/or top wall 332-*b* and that corresponds to a position of the second sidewall feature 356-*b*.

In some examples, the second sidewall feature 356-*b* may not extend around the entire inside perimeter of the waveguide device 305-*b*—e.g., when the second sidewall feature 356-*b* is located within the divided waveguide section 360-*b*. For example, the second sidewall feature 356-*b* may not extend across a portion of the top wall 332-*b* and the bottom wall 331-*b* that overlaps with a top and bottom of a septum (e.g., septum 351-*a* of FIG. 3A). In another example, the second sidewall feature 356-*b* may only be located on first sidewall 341-*b* and second sidewall 342-*b*. In such cases, an inset or outset may not be introduced into the septum.

In some examples, an inset or outset sidewall feature is introduced into a sidewall of the septum that runs parallel to the first sidewall 341-*b* or the second sidewall 342-*b* and that is aligned with the second sidewall feature 356-*b*—e.g., a middle of a sidewall feature on a first sidewall of the septum may be aligned with a center of a portion of the second sidewall feature 356-*b* located on the second sidewall 342-*b*. A length of the sidewall feature on the septum may extend from the bottom wall 331-*b* to the top wall 332-*b*. The sidewall feature on the septum may have a same (or nearly identical) width as the second sidewall feature 356-*b*. The sidewall feature on the septum may have a same (or nearly identical) height as the second sidewall feature 356-*b*—e.g., if the second sidewall feature 356-*b* is inset from the waveguide device 305-*b*. The sidewall feature on the septum may have a same (or nearly identical) depth as the second sidewall feature 356-*b*—e.g., if the second sidewall feature 356-*b* is outset from the waveguide device 305-*b*.

In some examples, a position of the second sidewall feature 356-*b* may be determined based on an impedance matching metric between the common waveguide port and the divided waveguide ports and/or a port-to-port isolation metric between the divided waveguide ports. For example, the second sidewall feature 356-*b* may be positioned to maximize (e.g., in combination with the first sidewall feature) a port-to-port isolation between the divided waveguide ports, improve an impedance match between the common waveguide port and the divided waveguide ports, or a combination thereof. A method for determining a position of the first sidewall feature 355-*a* and/or second sidewall feature 356-*b* is described in more detail herein and with reference to FIG. 6.

Figure 4:
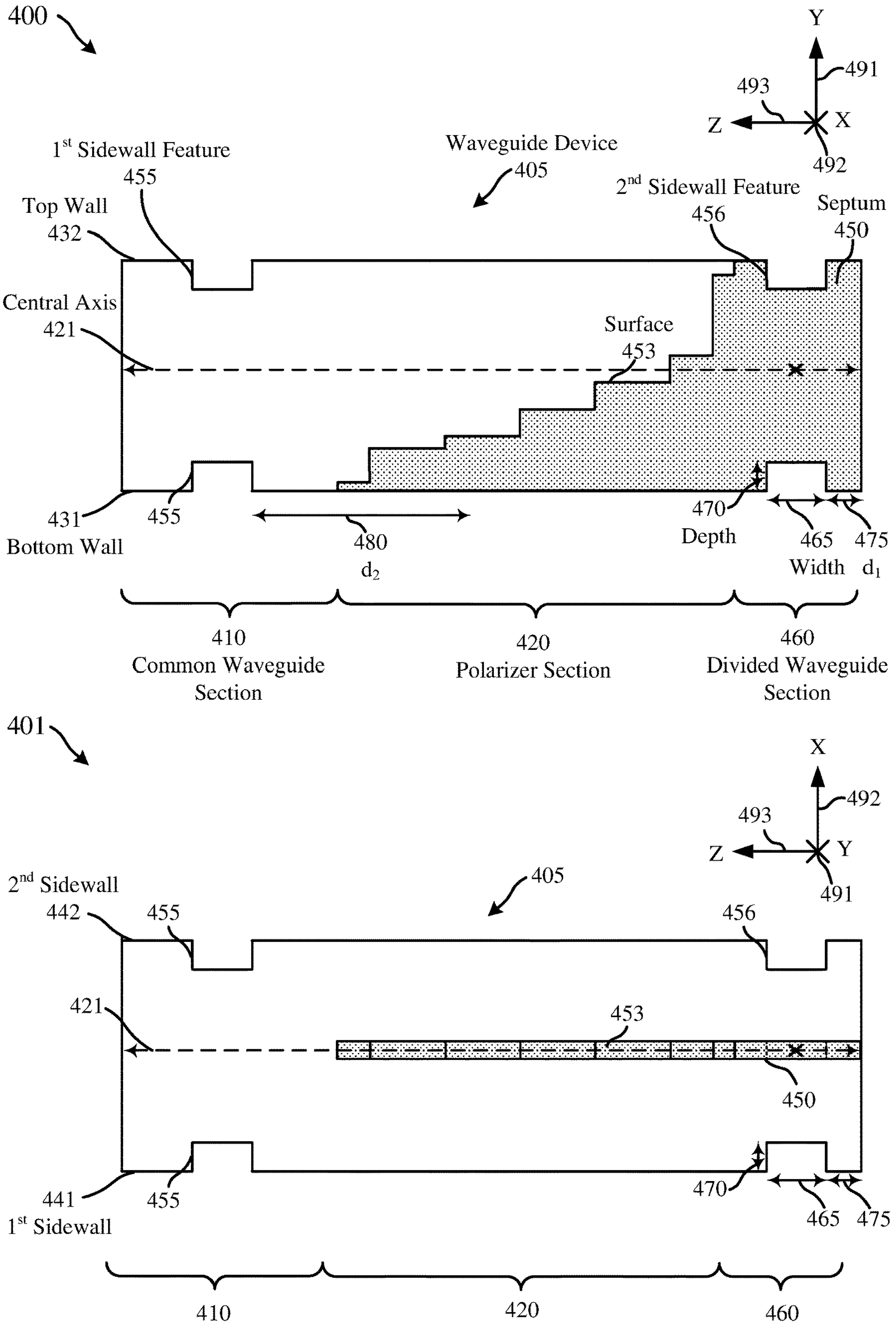
FIG. 4 shows cross-sectional views of an example dual-band waveguide device with sidewall features in accordance with various aspects of the present disclosure.

FIG. 4 shows cross-sectional views of a dual-band waveguide device with sidewall features in accordance with various aspects of the present disclosure. The first cross-sectional view 400 depicts a waveguide device 405 in the Y-Z plane. The second cross-sectional view 401 depicts the waveguide device 405 in the X-Z plane.

The waveguide device 405 may include common waveguide section 410, polarizer section 420, and divided waveguide section 460. Waveguide device 405 may also include top wall 432, bottom wall 431, first sidewall 241, and second sidewall 242. A central axis 421 of waveguide device 405 may run from one end of the waveguide device 405 to the other. Waveguide device 405 may also include a septum 450, which may include multiple stepped surfaces, such as surface 453. A first sidewall feature 455 and a second sidewall feature 456 may also be included on, or as part of, the sidewalls of the waveguide device 405.

The first sidewall feature 455 may be similarly constructed and/or positioned as described herein and with reference to FIGS. 1A through 2. Particularly, the first sidewall feature 455 may be an example of a sidewall feature 155 or sidewall feature 255 of FIGS. 1 and 2.

As shown by the first cross-sectional view 400 and the second cross-sectional view 401, the second sidewall feature 456 may be one contiguous feature (e.g., an inset or outset step) that extends around the perimeter of the waveguide device 405. In some examples, the second sidewall feature 456 is implemented by incorporating an inset step into the bottom wall 431, the top wall 432, the first sidewall 441, and the second sidewall 442 of the waveguide device 405. In other examples, the second sidewall feature 456 is implemented by disposing material (e.g., conductive material, dielectric material) on the bottom wall 431, the top wall 432, the first sidewall 441, and the second sidewall 442; in which case, the bottom wall 431, the top wall 432, the first sidewall 441, and the second sidewall 442 may extend uninterrupted from one end of the waveguide device 405 to the other end (or at least to the first sidewall feature 455).

A center of the second sidewall feature 456 may be positioned at a point along the central axis 421 (e.g., the point represented by the X in FIG. 4). A width 465 of the sidewall feature may remain constant (or nearly constant) across the perimeter of the waveguide device 405. In some examples, the width 465 may be between one-tenth and one-half of a wavelength of an operational frequency of the waveguide device 405. Thus, the second sidewall feature 456 may be symmetric around the point along the central axis 421. A depth 470 of the sidewall feature may also be uniform across the perimeter of the waveguide device 405. In some examples, the depth 470 may be between less than one-tenth of a wavelength of an operational frequency of the waveguide device 405. In some examples, the depth 470 varies from one end of the second sidewall feature 456 to the other end of the second sidewall feature 456—e.g., a depth of the first edge may be less than a depth of the second edge, or vice versa.

As shown in FIG. 4, the second sidewall feature 456 may be located entirely within the divided waveguide section 460. In some examples, a first edge of the second sidewall feature 456 is positioned a first distance 475 (which may also be referred to as $d_1$) from a beginning of the divided waveguide section 460. Although the second sidewall feature 456 is depicted as being entirely within the divided waveguide section 460 in FIG. 4, the second sidewall feature 456 may be located anywhere within a larger section comprising the divided waveguide section 460 and the polarizer section 420. In some examples, the second sidewall feature 456 may be located partially within the divided waveguide section 460 and partially within the polarizer section 420. In some examples, the second sidewall feature 456 may be located entirely within the polarizer section 420.

The septum 450 may be modified to accommodate the second sidewall feature 456. For example, an inset may be introduced into a top and bottom portion of the septum included in the divided waveguide section 460. Alternatively, if the second sidewall feature 456 is outset from the waveguide device 405, the septum 450 may be modified so that the septum 450 includes an outset in a top and bottom of the septum 450. In some examples, the second sidewall feature 456 may be located along the central axis 421 at a point that is solely within polarizer section 420 and aligned with surface 453, and the septum 450 may be modified so that an inset is included in a portion of the septum 450 located below surface 453. Alternatively, if the second sidewall feature 256 is outset from the waveguide device 405, the septum 450 may be modified so that a portion of the septum 450 located below surface 453 is outset from the waveguide device 405.

In some examples, an enhancement of an impedance matching characteristic between the common port of the waveguide device 405 and the divided ports of the waveguide device 405 is based on the width 465 and depth 470 of the second sidewall feature 456. Also, an enhancement of an isolation metric between the divided ports of the waveguide device 405 may be based on based on the width 465 and depth 470 of the second sidewall feature. The enhancement of the impedance matching and port-to-port isolation characteristics between may be further based on the first distance 475 between the second sidewall feature 456 and the beginning of the divided waveguide section 460.

Although the first cross-sectional view 400 depicts the second sidewall feature 456 as modifying the bottom wall 431 and the top wall 432 in FIG. 4, in some examples, the second sidewall feature 456 is not incorporated into the bottom wall 431 and the top wall 432. That is, the second sidewall feature 456 may only be present on the first sidewall 441 and the second sidewall 442. In other examples, the second sidewall feature 456 may be incorporated into the bottom wall 431 and the top wall 432 except that the second sidewall feature 456 may not be incorporated into a portion of the bottom wall 431 and the top wall 432 that coincides with a bottom or top surface of 453. In both cases, the profile of the septum 450 may be unchanged—that is, the septum 450 may be constructed similar to the septum 250 of FIG. 2.

Figure 5:
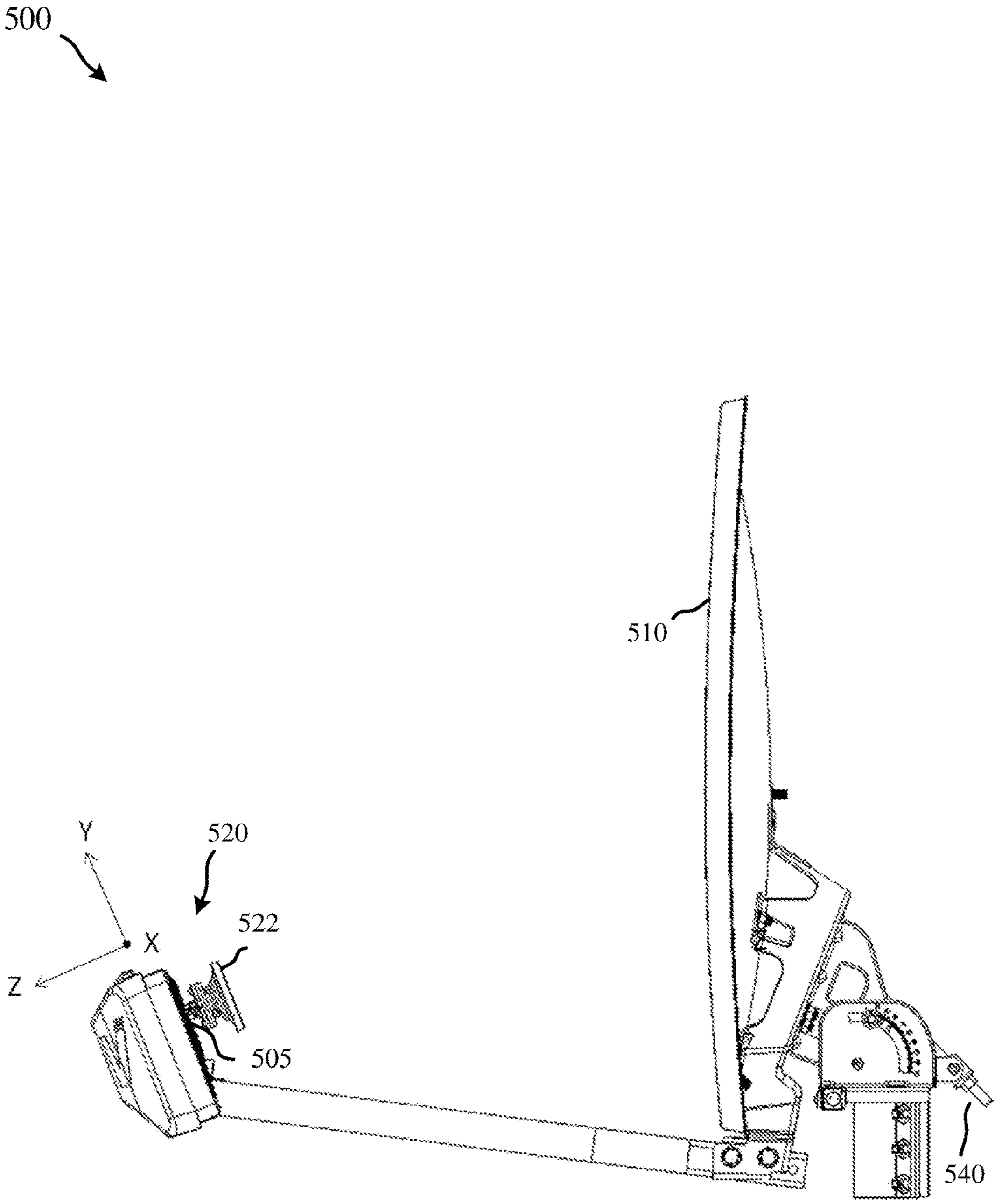
FIG. 5 shows a side view of a satellite antenna implementing a waveguide device in accordance with various aspects of the disclosure.

FIG. 5 shows a side view of a satellite antenna implementing a waveguide device in accordance with various aspects of the disclosure. The satellite antenna 500 may be part of a satellite communication system. The satellite antenna 500 may include a reflector 510 and a satellite communication assembly 520 (e.g., a feed assembly subsystem). The satellite communication assembly 520 may include a waveguide device 505, which may additionally be coupled with a feed horn assembly 522 (e.g., an antenna element). The waveguide device 505 may be an example of aspects of waveguide devices as described with reference to FIGS. 1 through 4. The satellite communication assembly 520 may process signals transmitted by and/or received at the satellite antenna 500. In some examples, the satellite communication assembly 520 may be a transmit and receive integrated assembly (TRIA), which may be coupled with a subscriber terminal via an electrical feed 540 (e.g., a cable).

As illustrated, the satellite communication assembly 520 may have the feed horn assembly 522 opening toward the reflector 510. Electromagnetic signals may be transmitted by and received at the satellite communication assembly 520, with electromagnetic signals reflected by the reflector 510 from/to the satellite communication assembly 520. In some examples, the satellite communication assembly 520 may further include a sub-reflector. In such examples, electromagnetic signals may be transmitted by and received at the satellite communication assembly 520 via downlink and uplink beams reflected by the sub-reflector and the reflector 510.

The waveguide device 505 may be used to transmit a first component signal from satellite antenna 500 using a first polarization (e.g., LHCP, etc.) by exciting the corresponding divided waveguide of the waveguide device 505. The waveguide may also be used to transmit a second component signal from satellite antenna 500 using a second polarization orthogonal to the first polarization (e.g. RHCP, etc.) by exciting a different corresponding divided waveguide of the waveguide device 505. Additionally, or alternatively, the waveguide device may be used to transmit one or more combined signals (e.g., linearly polarized signals) by concurrent excitation of the divided waveguides by two component signals having an appropriate phase offset.

Similarly, when a signal wave is received by satellite antenna 500, the waveguide device 505 directs the energy of the received signal with a particular basis polarization to the corresponding divided waveguide. In some examples the satellite antenna may receive a combined signal (e.g., linearly polarized signal) and separate the combined signal into two component signals in the divided waveguides, which may be phase adjusted and processed to recover the combined signal. The satellite antenna 500 may be used for receiving communication signals from a satellite, transmitting communication signals to the satellite, or bi-directional communication with the satellite (transmitting and receiving communication signals).

In some examples, the satellite antenna 500 may transmit energy using a first polarization and receive energy of a second (e.g., orthogonal) polarization concurrently. In such an example, the waveguide device 505 may be used to transmit a first signal from satellite antenna 500 using a first polarization (e.g., first linear polarization, LHCP, etc.) by appropriate excitation of the divided waveguide(s) of the waveguide device 505. Concurrently, the satellite antenna can receive a signal of the same or a different frequency having a component signal with a second polarization (e.g., second linear polarization, RHCP, etc.), where the second polarization is orthogonal to the first polarization. The waveguide device 505 can direct the energy of the received signal to the divided waveguide(s) for processing in a receiver to recover and demodulate the received signal.

In various examples the satellite communication assembly 520 can be used to receive and/or transmit single-band, dual-band, and/or multi-band signals. For instance, in some examples, signals received and/or transmitted by the satellite communication assembly 520 may be characterized by multiple carrier frequencies in a frequency range of 17.3 to 31.0 GHz. In such examples, the performance of the waveguide device 505 can be improved by including various sidewall features as described above.

In some examples, multiple waveguide devices, like waveguide device 505, may be coupled with multiple antenna elements. Each waveguide device may be associated with one or more antenna elements. In such cases, one or more waveguide combiner/divider networks may be used to connect respective divided waveguides of the waveguide devices with common network ports associated with each basis polarization. For example, a waveguide junction may be formed that combines/divides signals between a first common network port and the divided waveguides from multiple waveguide devices associated with a first basis polarization. The multiple waveguide devices may be arranged in an array in a plane that is orthogonal to the central axis of the waveguide devices and/or the boresight of an antenna. (e.g., a rectangular, square, circular, elliptical, polygon, or any other shaped array). Additionally, or alternatively, the multiple waveguide devices may be arranged in a transversely staggered array, where waveguide devices may be aligned in one transverse direction, and staggered in another transverse direction, where transverse refers to the direction orthogonal to a central axis of the waveguide devices and/or the principal axis of the antenna. Additionally, or alternatively, the multiple waveguide devices may be arranged in an axially staggered array, where axial refers to a direction along the central axis of the waveguide devices and/or a principal axis of the antenna.

Figure 6:
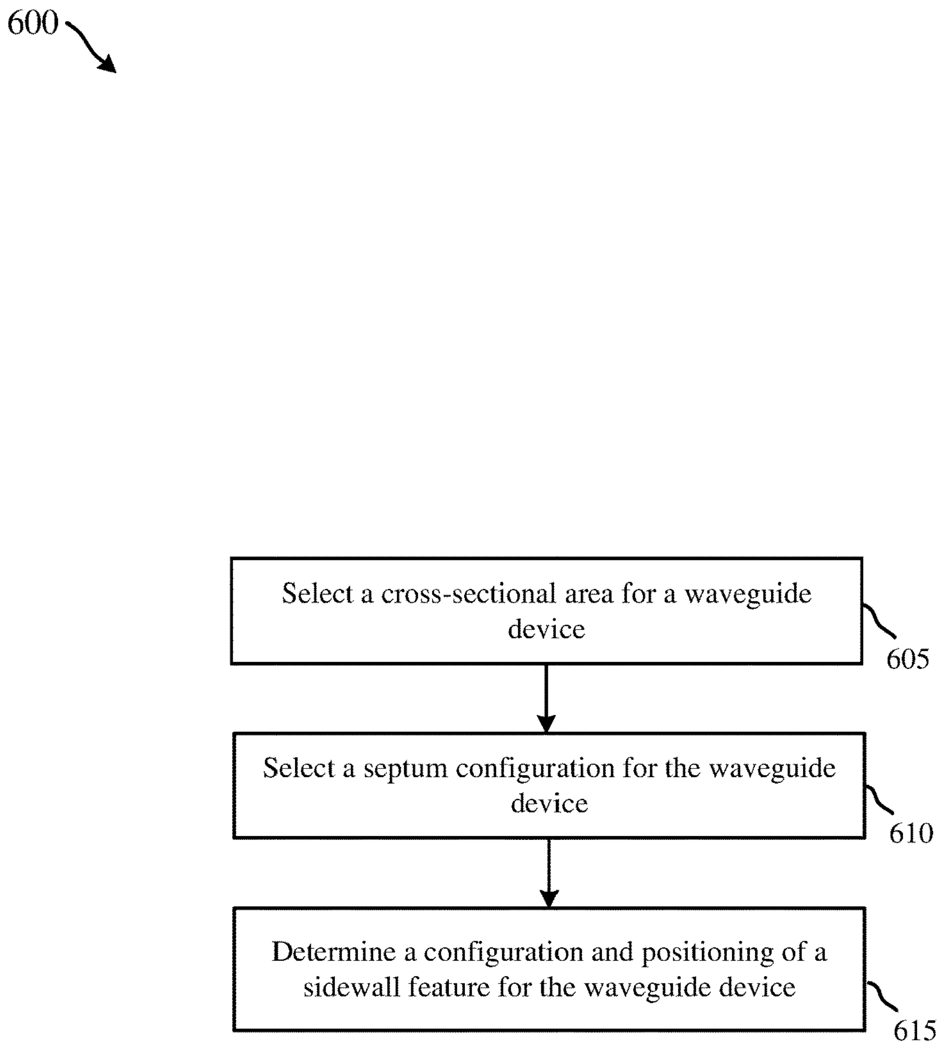
FIG. 6 shows a method for designing a waveguide device having at least one sidewall feature in accordance with various aspects of the present disclosure.

FIG. 6 shows a method for designing a waveguide device having at least one sidewall feature in accordance with various aspects of the present disclosure. The method 600 may be used, for example, to design a dual-band waveguide device with an enhanced RF response. The method 600 may be used to select the number, dimensions, and relative positions of the one or more sidewall features for the waveguide devices described with reference to FIGS. 1 through 5.

At 605, a cross-sectional area for a waveguide device may be selected. For example, the cross-sectional area may be sized so that it is 15% above the cutoff frequency of the dominant—$TE_{10}$ and $TE_{01}$—modes, $f_{c1}$, in the common waveguide section. If the full span of the operating frequency band(s) is positioned between the cutoff frequency of the dominant modes and the cutoff frequency of the first higher-order—$TE_{11}$ and $TM_{11}$—modes, $f_{c2}$, the cross-sectional area may be sized so that the full span of the operating frequency band(s) is positioned symmetrically between the two cutoff frequencies, $f_{c1}$ and $f_{c2}$. Should the full span of the operating frequency bands be larger than the frequency spectrum between the cutoff frequencies of the dominant and first higher-order modes, the cross-sectional area may be selected to minimize an excitation of the higher-order modes caused by signals using the wide range of frequencies (e.g., 17.3 to 31.0 GHz). In general, the less the upper end (e.g., 31.0 GHz) of the full span of the operating frequency bands exceeds the cutoff frequency of the first higher-order modes, $f_{c2}$, the easier it is to minimize the excitation of the higher-order modes within the waveguide device.

At 610, features of a septum may be selected. For example, a profile configuration (e.g., a stepped configuration), a thickness, and a length for the septum may be determined. In some examples, the features of the septum are selected to improve an axial ratio of a polarization ellipse within the waveguide device. In some examples, the cross-sectional area and the features of the septum are designed together to improve a polarization purity associated with the waveguide device—e.g., by minimizing the excitation of the higher-order modes and reducing an axial ratio of the polarization ellipse. In some examples, the cross-sectional area and septum configuration may be selected to achieve a polarization purity within a desired range. For example, the cross-sectional area and septum configuration may be selected to achieve an axial ratio of less than 1 dB and an excitement of the higher-order modes relative to the dominant modes that is below −18, −20, −22, or −24 dB.

At 615, a position and dimensions (e.g., length, width and depth or height) of a sidewall feature that is symmetrical around a point along a central axis of the waveguide device may be determined. In some examples, the sidewall feature is positioned and constructed to improve a matching of an impedance of a common port in the waveguide device with an impedance of divided ports in the waveguide device without (or with minimal effect) to a polarization purity of the waveguide device. In some examples, the sidewall feature is positioned and constructed to improve an isolation between the divided ports of the waveguide device. In some examples, the sidewall feature is positioned and constructed to optimize an impedance matching and port-to-port isolation combination—in such cases, further enhancements to either the impedance matching or the port-to-port isolation may cause degradation of the other metric.

In some cases, the sidewall feature is limited to being positioned entirely within a common waveguide section of the waveguide device. However, positioning the sidewall feature outside the common waveguide section (e.g., fully or partially within a polarizer section of the waveguide device) may provide increased enhancements to the performance of the waveguide device. In such cases, the positioning of the sidewall feature may affect the construction of the septum—e.g., may introduce an inset or outset in the septum. The changes to the septum may negatively affect the axial ratio performance. Thus, the method may be or include an iterative process. That is, after determining the configuration and position of the sidewall feature, the profile and dimensions of the septum may be altered to return the axial ratio performance to a desired value (e.g., <1 dB).

In some examples, a position and dimensions of a second sidewall feature that is symmetrical around a different point along the central axis of the waveguide device may be determined. In some examples, the second sidewall feature is positioned and constructed to improve a matching of an impedance of a common port in the waveguide device with an impedance of divided ports in the waveguide device. In some examples, the second sidewall feature is positioned and constructed to improve an isolation between the divided ports of the waveguide device. In some examples, the second sidewall feature is positioned and constructed to improve both an impedance matching and port-to-port isolation combination—in such cases, further enhancements to either the impedance matching or the port-to-port isolation may cause degradation of the other metric. In some examples, the second sidewall feature is configured to be on two sidewalls that run in parallel with a length of the septum. In some examples, the second sidewall feature is configured so as to not interfere with the construction of the septum—e.g., by avoiding a portion of the bottom and top wall of the waveguide device that is coincident with a bottom and top surface of the septum.

When the second sidewall feature affects a construction of the septum, the axial ratio performance of the waveguide device may be negatively affected. Thus, the method may be or include an iterative process. That is, after determining the configuration and position of the second sidewall feature, the profile and dimensions of the septum may be altered to return the axial ratio performance to a desired value (e.g., 1 dB).

In some examples, the selection of the septum configuration and sidewall feature configuration(s) may be performed together. That is, instead of selecting the septum configuration and then selecting the sidewall feature configurations, the septum configuration may be selected in combination with the selection of the sidewall features to obtain enhancements in the RF response of the waveguide device.

In some examples, the first and/or second sidewall feature may be incorporated into the waveguide device during a die casting procedure, in which an inset or outset step is incorporated into the sidewalls of the waveguide device at locations determined for the sidewall features. Thus, the sidewall features may be a part of the sidewalls of the waveguide device. The die casting procedure may include constructing a mold (e.g., a split block) having the shape of the desired waveguide device and injecting a material into the mold. By maintaining sidewall features having small heights (e.g., <0.5 mm), the difficulty of the die casting process may not (or may marginally) be increased—e.g., the production of the casting tool and removal of the die cast parts from the casting tool may not be increased. In some examples, the first and/or second sidewall feature may be incorporated into the waveguide device by disposing a material (e.g., conductive material, dielectric material) onto an interior of the waveguide device—e.g., when the sidewall features are inset steps.

It should be noted that the described techniques refer to possible implementations, and that operations and components may be rearranged or otherwise modified and that other implementations are possible. Further portions from two or more of the methods or apparatuses may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. The functions described herein may also be implemented in various ways, with different materials, features, shapes, sizes, or the like. Features implementing functions may also be physically located at various positions, including being distributed such that portions of functions are implemented at different physical locations.

As used in the description herein, the term "parallel" is not intended to suggest a limitation to precise geometric parallelism. For instance, the term "parallel" as used in the present disclosure is intended to include typical deviations from geometric parallelism relating to such considerations as, for example, manufacturing and assembly tolerances. Furthermore, certain manufacturing process such as molding or casting may require positive or negative drafting, edge chamfers and/or fillets, or other features to facilitate any of the manufacturing, assembly, or operation of various components, in which case certain surfaces may not be geometrically parallel, but may be parallel in the context of the present disclosure.

Similarly, as used in the description herein, the terms "orthogonal" and "perpendicular", when used to describe geometric relationships, are not intended to suggest a limitation to precise geometric perpendicularity. For instance, the terms "orthogonal" and "perpendicular" as used in the present disclosure are intended to include typical deviations from geometric perpendicularity relating to such considerations as, for example, manufacturing and assembly tolerances. Furthermore, certain manufacturing process such as molding or casting may require positive or negative drafting, edge chamfers and/or fillets, or other features to facilitate any of the manufacturing, assembly, or operation of various components, in which case certain surfaces may not be geometrically perpendicular, but may be perpendicular in the context of the present disclosure.

As used in the description herein, the term "orthogonal," when used to describe electromagnetic polarizations, are meant to distinguish two polarizations that are separable. For instance, two linear polarizations that have unit vector directions that are separated by 90 degrees can be considered orthogonal. For circular polarizations, two polarizations are considered orthogonal when they share a direction of propagation, but are rotating in opposite directions.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A waveguide device, comprising:

a housing comprising a first set of opposing sidewalls and a second set of opposing sidewalls, wherein the housing comprises a common port at a first end of the housing;

a septum disposed within the housing and extending, at a second end of the housing, from a first sidewall of the first set of opposing sidewalls to a second sidewall of the first set of opposing sidewalls to form a first divided port and a second divided port at the second end of the housing; and a sidewall feature on the first set of opposing sidewalls and the second set of opposing sidewalls at a position along a central axis of the housing, wherein the sidewall feature has a same shape on each of the first set of opposing sidewalls and the second set of opposing sidewalls, and wherein:

the sidewall feature comprises a first edge closer to the first end of the housing and a second edge closer to the second end of the housing, the sidewall feature has a width in a direction along the central axis of the housing, the width being measured between the first edge and the second edge, and a height of the sidewall feature is less than one tenth of a wavelength of an operational frequency of the waveguide device and the width of the sidewall feature is within a range of one tenth to one half of the wavelength of the operational frequency.

2. The waveguide device of claim 1, wherein the first divided port and the second divided port comprise a first portion along the central axis of the housing, the position of the sidewall feature being located along a second portion of the central axis of the housing that is non overlapping with the first portion.

3. The waveguide device of claim 1, wherein the position of the sidewall feature is based at least in part on an impedance matching metric between the common port, the first divided port, and the second divided port, an isolation metric between the first divided port and the second divided port, or both.

4. The waveguide device of claim 1, wherein the sidewall feature comprises a step in the first set of opposing sidewalls and the second set of opposing sidewalls.

5. The waveguide device of claim 1, wherein the sidewall feature comprises a step that is inset or outset, wherein the sidewall feature is within a common waveguide section of the housing, polarizer section of the housing, or both, the waveguide device further comprising:

a second sidewall feature on the first set of opposing sidewalls and the second set of opposing sidewalls at a second position along the central axis of the housing that is within a divided waveguide section of the housing, wherein:

the second sidewall feature comprises a first edge that is closer to the first end of the housing and a second edge closer to the second end of the housing, the second sidewall feature has a second width in the direction along the central axis of the housing, the second width being measured between the first edge of the second sidewall feature and the second edge of the second sidewall feature, and a height of the second sidewall feature varies from one end of the second sidewall feature to an opposing end of the second sidewall feature such that a first height of the first edge at the one end of the second sidewall feature is different from a second height of the second edge at the opposing end of the second sidewall feature.

6. The waveguide device of claim 1, wherein the height of the sidewall feature varies along the central axis.

7. The waveguide device of claim 1, wherein the sidewall feature extends around a perimeter of an interior of the housing.

8. The waveguide device of claim 1, wherein the first set of opposing sidewalls are separated by a first distance at a second position along the central axis that is located between the second end of the housing and the first edge of the sidewall feature and by a second distance at the position of the sidewall feature based at least in part on the height of the sidewall feature.

9. The waveguide device of claim 8, wherein the first set of opposing sidewalls are separated by the first distance at a third position along the central axis that is located between the first end of the housing and the second edge of the sidewall feature that is closer to the first end than the first edge of the sidewall feature.

10. The waveguide device of claim 8, wherein the first distance is greater than the second distance.

11. The waveguide device of claim 8, wherein the first distance is less than the second distance.

12. The waveguide device of claim 8, wherein the second set of opposing sidewalls are separated by a third distance at the second position and a fourth distance at the position of the sidewall feature.

13. The waveguide device of claim 12, wherein the second set of opposing sidewalls are separated by the third distance at a third position along the central axis that is located between the first end of the housing and the second edge of the sidewall feature.

14. The waveguide device of claim 1, wherein:

the first sidewall of the first set of opposing sidewalls comprises a first portion of the sidewall feature, the second sidewall of the first set of opposing sidewalls comprises a second portion of the sidewall feature, a first sidewall of the second set of opposing sidewalls comprises a third portion of the sidewall feature, and a second sidewall of the second set of opposing sidewalls comprises a fourth portion of the sidewall feature.

15. The waveguide device of claim 14, wherein a first angle between the portions of the sidewall feature and the corresponding sidewalls of the first set of opposing sidewalls and the second set of opposing sidewalls is between 40 and 90 degrees.

16. The waveguide device of claim 14, wherein a center of the first portion of the sidewall feature, a center of the second portion of the sidewall feature, a center of the third portion of the sidewall feature, and a center of the fourth portion of the sidewall feature are aligned.

17. The waveguide device of claim 1, wherein the first divided port and the second divided port comprise a first portion of the housing along the central axis, the waveguide device further comprising:

a second sidewall feature on the first set of opposing sidewalls and the second set of opposing sidewalls at a second position along the first portion of the housing along the central axis.

18. The waveguide device of claim 1, wherein the first divided port and the second divided port comprise a first portion of the housing along the central axis, the waveguide device further comprising:

a second sidewall feature on the first set of opposing sidewalls at a second position along the first portion of the housing.

19. The waveguide device of claim 18, wherein the second sidewall feature is on at least a portion of the second set of opposing sidewalls.

20. The waveguide device of claim 1, wherein the housing comprises:

a common waveguide section that comprises the common port, a polarizer section that comprises a first portion of the septum, and a divided waveguide section that comprises a first divided waveguide and a second divided waveguide that are separated by a second portion of the septum that extends from the first sidewall of the first set of opposing sidewalls to the second sidewall of the first set of opposing sidewalls.

21. The waveguide device of claim 20, wherein:

the first edge and the second edge of the sidewall feature are located in the common waveguide section of the housing, the first edge and the second edge of the sidewall feature are located in the polarizer section of the housing, or the second edge of the sidewall feature is located in the common waveguide section and the first edge is located in the polarizer section.

22. The waveguide device of claim 20, further comprising:

a second sidewall feature on the first set of opposing sidewalls and the second set of opposing sidewalls at a second position along the central axis of the housing, wherein:

the first edge and the second edge of the second sidewall feature are located in the divided waveguide section of the housing, the first edge and the second edge of the second sidewall feature are located in the polarizer section of the housing, or the second edge of the second sidewall feature is located in the divided waveguide section and the first edge is located in the polarizer section.

23. The waveguide device of claim 1, wherein:

a first portion of the first set of opposing sidewalls extends between the first end of the housing and the first edge of the sidewall feature and a first portion of the second set of opposing sidewalls extends between the first end of the housing and the first edge of the sidewall feature, and a second portion of the first set of opposing sidewalls is adjacent to the second edge of the sidewall feature and a second portion of the second set of opposing sidewalls is adjacent to the second edge of the sidewall feature.

24. The waveguide device of claim 23, wherein:

the sidewall feature is a single step positioned between the first portion of the first set of opposing sidewalls and the second portion of the first set of opposing sidewalls and is further positioned between the first portion of the second set of opposing sidewalls and the second portion of the second set of opposing sidewalls.

25. The waveguide device of claim 24, wherein:

the first portion of the first set of opposing sidewalls and the first portion of the second set of opposing sidewalls form the common port, and the second portion of the first set of opposing sidewalls and the second portion of the second set of opposing sidewalls form a polarizer section of the housing.

26. The waveguide device of claim 25, wherein:

the first edge of the sidewall feature has a first height and the second edge of the sidewall feature has a second height, and the first height is between the sidewall feature and the first portions of the first set of opposing sidewalls and the second set of opposing sidewalls.

27. The waveguide device of claim 26, wherein the second height is between the sidewall feature and the second portions of the first set of opposing sidewalls and the second set of opposing sidewalls.

28. The waveguide device of claim 24, wherein the first edge of the sidewall feature is adjacent to the first portion of the first set of opposing sidewalls and the first portion of the second set of opposing sidewalls that form the common port.

29. The waveguide device of claim 28, wherein the second edge of the sidewall feature is adjacent to the second portion of the first set of opposing sidewalls and the second portion of the second set of opposing sidewalls that form a polarizer section of the housing.

30. A waveguide device, comprising:

a housing comprising a first set of opposing sidewalls and a second set of opposing sidewalls, wherein the housing comprises a common port at a first end of the housing;

a septum disposed within the housing and extending, at a second end of the housing, from a first sidewall of the first set of opposing sidewalls to a second sidewall of the first set of opposing sidewalls to form a first divided port and a second divided port at the second end of the housing; and a sidewall feature on the first set of opposing sidewalls and the second set of opposing sidewalls at a position along a central axis of the housing, wherein the sidewall feature has a same shape on each of the first set of opposing sidewalls and the second set of opposing sidewalls, and wherein:

the sidewall feature comprises a first edge closer to the first end of the housing and a second edge closer to the second end of the housing, the sidewall feature has a width in a direction along the central axis of the housing, the width being measured between the first edge and the second edge, and a first portion of the sidewall feature associated with the first sidewall of the first set of opposing sidewalls, a second portion of the sidewall feature associated with the second sidewall of the first set of opposing sidewalls, a third portion of the sidewall feature associated with a first sidewall of the second set of opposing sidewalls, and a fourth portion of the sidewall feature associated with a second sidewall of the second set of opposing sidewalls have a same width.

31. A waveguide device, comprising:

a housing comprising a first set of opposing sidewalls and a second set of opposing sidewalls, wherein the housing comprises a common port at a first end of the housing;

a septum disposed within the housing and extending, at a second end of the housing, from a first sidewall of the first set of opposing sidewalls to a second sidewall of the first set of opposing sidewalls to form a first divided port and a second divided port at the second end of the housing; and a sidewall feature on the first set of opposing sidewalls and the second set of opposing sidewalls at a position along a central axis of the housing, wherein the sidewall feature has a same shape on each of the first set of opposing sidewalls and the second set of opposing sidewalls, and wherein:

the sidewall feature comprises a first edge closer to the first end of the housing and a second edge closer to the second end of the housing, the sidewall feature has a width in a direction along the central axis of the housing, the width being measured between the first edge and the second edge, and the sidewall feature comprises a step that is inset or outset, wherein the first edge of the sidewall feature is in a common waveguide section of the housing and the second edge of the sidewall feature is in a polarizer section of the housing, wherein a height of the sidewall feature varies from one end of the sidewall feature to an opposing end of the sidewall feature such that a first height of the first edge at the one end of the sidewall feature is different from a second height of the second edge at the opposing end of the sidewall feature.

* * * * *